United States Patent
Lim et al.

(10) Patent No.: US 9,871,992 B2
(45) Date of Patent: Jan. 16, 2018

(54) CONTENT OUTPUT APPARATUS, MOBILE APPARATUS, AND CONTROLLING METHODS THEREOF

(71) Applicant: SAMSUNG ELECTRONICS CO., LTD., Suwon-si (KR)

(72) Inventors: Byung-keuk Lim, Suwon-si (KR); Se-hyoung Park, Seoul (KR); Sang-bum Sung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 215 days.

(21) Appl. No.: 14/713,587

(22) Filed: May 15, 2015

(65) Prior Publication Data

US 2015/0334338 A1   Nov. 19, 2015

Related U.S. Application Data

(60) Provisional application No. 61/994,377, filed on May 16, 2014.

(30) Foreign Application Priority Data

Jun. 30, 2014 (KR) ........................ 10-2014-0081042

(51) Int. Cl.
*H04N 5/60* (2006.01)
*H04N 5/04* (2006.01)
(Continued)

(52) U.S. Cl.
CPC ................. *H04N 5/60* (2013.01); *H04N 5/04* (2013.01); *H04N 21/4108* (2013.01);
(Continued)

(58) Field of Classification Search
None
See application file for complete search history.

(56) References Cited

U.S. PATENT DOCUMENTS 7,480,008 B2 * 1/2009 Kim ................... H04N 21/4341
                                                      348/515
8,917,888 B2   12/2014 Nakamura
(Continued)

FOREIGN PATENT DOCUMENTS

CN   1925583 A    3/2007
CN   101741491 A  6/2010
(Continued)

OTHER PUBLICATIONS

Communication dated Aug. 28, 2015, issued by the International Searching Authority in counterpart International Application No. PCT/KR2015/004837 (PCT/ISA/210 & PCT/ISA/237).
(Continued)

*Primary Examiner* — Paul Huber
(74) *Attorney, Agent, or Firm* — Sughrue Mion, PLLC

(57) ABSTRACT

A content output apparatus, methods for controlling a content apparatus, and a mobile apparatus are provided. The content output apparatus includes a receiver configured to receive content, a display configured to output a video signal of the content, a speaker configured to output an audio signal of the content, a communicator configured to transmit the audio signal to at least one external speaker, and a controller configured to determine whether the audio signal is related to the video signal, and display a user interface screen for inducing a selection of an output mode which transmits the audio signal to the at least one external speaker with a communication method corresponding to the determination result among a plurality of output modes via the display.

20 Claims, 24 Drawing Sheets

(51) Int. Cl.
  *H04N 21/41*    (2011.01)
  *H04N 21/422*   (2011.01)
  *H04N 21/43*    (2011.01)
  *H04N 21/434*   (2011.01)
  *H04N 21/436*   (2011.01)
  *H04N 21/4363*  (2011.01)
  *H04N 21/485*   (2011.01)
  *H04S 5/00*     (2006.01)

(52) U.S. Cl.
  CPC ..... *H04N 21/4222* (2013.01); *H04N 21/4307* (2013.01); *H04N 21/4341* (2013.01); *H04N 21/43615* (2013.01); *H04N 21/43637* (2013.01); *H04N 21/4852* (2013.01); *H04R 2420/07* (2013.01); *H04S 5/00* (2013.01)

(56)            References Cited

U.S. PATENT DOCUMENTS

| 8,958,742 | B2  |   | 2/2015  | Lee et al. |
| 9,137,835 | B2  | * | 9/2015  | Sato ................... H04N 21/4307 |
| 2003/0046705 | A1 |   | 3/2003  | Sears |
| 2004/0205214 | A1 |   | 10/2004 | Bang et al. |
| 2006/0161835 | A1 |   | 7/2006  | Panabaker et al. |
| 2008/0320539 | A1 | * | 12/2008 | Ohkita ............. H04N 21/43615 725/118 |
| 2009/0290064 | A1 |   | 11/2009 | Matsumoto et al. |
| 2010/0115562 | A1 |   | 5/2010  | Koike |
| 2010/0124403 | A1 |   | 5/2010  | Thornburg |
| 2012/0057725 | A1 |   | 3/2012  | Nakamura |
| 2012/0063603 | A1 |   | 3/2012  | Evans et al. |
| 2012/0206650 | A1 |   | 8/2012  | Lin |
| 2013/0332956 | A1 |   | 12/2013 | Lee et al. |
| 2014/0376873 | A1 |   | 12/2014 | Tanaka et al. |

FOREIGN PATENT DOCUMENTS

| CN | 102385888   A  | 3/2012  |
| CN | 103248560   A  | 8/2013  |
| CN | 103491404   A  | 1/2014  |
| EP |   2672685   A2 | 12/2013 |
| JP | 2013192247  A  | 9/2013  |
| KR | 1020130137924 A | 12/2013 |
| WO | 2013/132562 A1 | 9/2013  |

OTHER PUBLICATIONS

Communication dated Oct. 26, 2017, issued by the European Patent Office in counterpart European Application No. 15792466.3.

Communication dated Nov. 1, 2017, issued by the State Intellectual Property Office of People's Republic of China in counterpart Chinese Application No. 201510250683.0.

\* cited by examiner

CONTENT OUTPUT APPARATUS, MOBILE APPARATUS, AND CONTROLLING METHODS THEREOF

CROSS-REFERENCE TO RELATED APPLICATION

This application claims priority from Korean Patent Application No. 10-2014-0081042, filed on Jun. 30, 2014 in the Korean Intellectual Property Office, and U.S. Provisional Application No. 61/994,377, filed on May 16, 2014, the disclosures of which are incorporated herein by reference in their entireties.

BACKGROUND

1. Field

Apparatuses and methods consistent with exemplary embodiments relate to a content output apparatus, a mobile apparatus, and controlling methods thereof, and more particularly, to a content output apparatus that transmits an audio signal to a plurality of speakers and selectively sets an output mode for synchronization of the audio signal, a mobile apparatus, and controlling method thereof.

2. Description of the Related Art

Technology that allows an audio signal output from a multimedia reproducing apparatus to be transmitted to a plurality of speaker devices coupled to the multimedia reproducing apparatus through wireless network connections, and the audio signal to be output by the plurality of speaker devices has been widely used.

The quality of audio reproduction can be limited due to design and structural issues of an apparatus such as a television (TV), which can have a relatively poor sound quality as compared to speaker devices that have a high sound quality speaker function. Such speaker devices can be coupled with a TV or other content providing device using wireless network connections, thus making it is possible to listen to music or other audio reproduction with improved sound quality.

However, when an audio signal that is reproduced by the TV in real time is also transmitted via network connections to the plurality of speaker devices located away from the TV, a transmission delay occurs. The transmission delay increases in proportion to the distance that the audio signal is transmitted.

If content to be reproduced in real time is music or other audio-only content that involves only a an audio signal, reproduction of audio may be delayed at the transmission side, such that reproduction at the transmission side is in synchronization with an output of a speaker coupled through a network. However, if an apparatus simultaneously outputs a video signal and a audio signal, such as a TV, and the audio signal output is delayed, the audio signal of the TV will not be in synchronization with the video signal of the TV.

There is an increased need to automatically set outputs between an audio signal and a video signal that is output from a content output apparatus and an audio signal that is output from an external speaker and/or to display a message related to the output and notify the user of the output.

SUMMARY

One or more exemplary embodiments may overcome the above disadvantages and other disadvantages not described above. However, it is understood that one or more exemplary embodiments are not required to overcome the disadvantages described above, and one or more exemplary embodiments may not necessarily overcome any of the problems described above.

One or more exemplary embodiments provide a content output apparatus that can be selectively operated in one output mode among a plurality of output modes according to a reproduction mode of content and the type of content output apparatus, a mobile apparatus, and controlling method thereof.

According to an aspect of an exemplary embodiment, there is provided a content output apparatus. The content output apparatus may include: a receiver configured to receive content; a display configured to output a video signal of the content; a speaker configured to output an audio signal of the content; a communicator configured to transmit the audio signal to at least one external speaker; and a controller configured to determine whether the audio signal is related to the video signal, and display a user interface screen for inducing a selection of an output mode which transmits the audio signal to the at least one external speaker with a communication method corresponding to the determination result among a plurality of output modes via the display.

The controller may control the display and the speaker to output the video signal and the audio signal through synchronization with an audio signal output operation of the at least one external speaker in a first output mode among the plurality of output modes, and control the speaker to output the audio signal through synchronization with the audio signal output operation of the at least one external speaker in a second output mode among the plurality of output modes.

The controller may be configured to in response to the audio signal being determined to be related to the video signal, even though a user manipulation for selecting the second output mode via the user interface screen is input, display a user interface (UI) for inducing to select the first output mode or operate in the first output mode automatically.

The controller may be configured to in response to the audio signal being determined to be related to the video signal, activate a user UI for selecting the first output mode and deactivate a user interface for selecting the second output mode in the user interface screen.

The controller may be configured to transmit the audio signal to the at least one external speaker, and control the display and the speaker to output the video signal and the audio signal through synchronization of the video signal and the audio signal separately from the audio signal output operation of the at least one external speaker in a third output mode among the plurality of output modes.

The controller may be configured to control the communicator to perform communication with the at least one external speaker in the first output mode through a second communication method different from a first communication method used in the second output mode and the third output mode.

The controller may control the communicator to perform communication with the at least one external speaker through a Wi-Fi Direct method in the first output mode, and to perform communication with the at least one external speaker through a Wi-Fi method in the second output mode and the third output mode.

The controller may be operated in the first output mode in response to the video signal being included in the content, and operated in the second output mode in response to the video signal being not included in the content.

The content output apparatus may further include a connector configured to be connectable to a source device configured to provide the content. The controller may determine whether or not the video signal is included in the content based on the type of the source device coupled to the connector.

The controller may be configured to be operated in one of the first to third output modes according to a user operation for selecting the output mode.

The controller may be configured to display an information message for output mode selection in the display in response to the first output mode being selected by the user operation in a state in which the video signal is not included in the content.

The controller may be configured to be operated in one of the first output mode and the third mode according to the user operation in a state in which the video signal is included in the content.

According to an aspect of an exemplary embodiment, there is provided a mobile apparatus. The mobile apparatus may include: a communicator configured to communicate with at least one external speaker; a user interface configured to display a control screen for the at least one external speaker; and a controller configured to control an operation of the external speaker according to a user operation input to the control screen. The controller may be configured to transmit a control signal, which controls a content output apparatus to communicate with the external speaker according to an output mode corresponding to the type of the content output apparatus among a plurality of output modes, to the content output apparatus in response to the content output apparatus configured to provide an audio signal to the external speaker being selected in the control screen.

The plurality of output modes may include at least one of a first output mode which provides the audio signal to the at least one external speaker and outputs a video signal and the audio signal through synchronization with an audio signal output operation of the at least one external speaker, a second output mode which provides the audio signal to the at least one external speaker and outputs the audio signal through synchronization with the audio signal output operation of the at least one external speaker, and a third output mode which provides the audio signal to the at least one external speaker and outputs the video signal and the audio signal through synchronization of the video signal and the audio signal separately from the audio signal output operation of the at least one external speaker.

The controller may be configured to transmit the control signal for controlling the content output apparatus to be operated in one of the first output mode, which outputs the video signal and the audio signal through the synchronization with the audio signal output operation of the at least one external speaker, and the third output mode, which outputs the video signal and the audio signal through the synchronization of the video signal and the audio signal separately from the audio signal output operation of the at least one external speaker, to the content output apparatus in response to the content output apparatus being an apparatus configured to provide content including the video signal and the audio signal. The controller may transmit the control signal for controlling the content output apparatus to be operated in the second output mode, which outputs the audio signal through the synchronization with the audio signal output operation of the at least one external speaker, to the content output apparatus in response to the content output apparatus being an apparatus configured to provide content including only the audio signal.

The controller may be configured to transmit the control signal, which controls the content output apparatus to communicate with the external speaker according to one of the plurality of output modes determined based on a reproduction mode of the content provided from the content output apparatus, to the content output apparatus in response to the content output apparatus configured to provide the audio signal to the at least one external speaker being selected in the control screen.

The controller may be configured to transmit the control signal, which controls the content output apparatus to communicate with a grouped external speaker according to the output mode corresponding to the type of the content output apparatus, to the content output apparatus in response to a user operation for grouping at least one of the at least one external speaker being input to the control screen.

According to an aspect of an exemplary embodiment, there is provided a method of controlling a content output apparatus including a receiver configured to receive content, a display configured to output a video signal of the content, a speaker configured to output an audio signal of the content, and a communicator configured to transmit the audio signal to at least one external speaker. The method may include determining whether the audio signal is related to the video signal in response to the contents being input; displaying a screen for inducing a selection of an output mode which transmits the audio signal to the at least one external speaker with a communication method corresponding to the determination result among a plurality of output modes; and transmitting the audio signal of the content to the at least one external speaker by operating the content in the selected output mode.

The transmitting may include controlling the display and the speaker to output the video signal and the audio signal through synchronization with an audio signal output operation of the at least one external speaker in a first output mode among the plurality of output modes, and controlling the speaker to output the audio signal through synchronization with the audio signal output operation of the at least one external speaker in a second output mode among the plurality of output modes.

According to an aspect of an exemplary embodiment, there is provided a method of controlling a mobile apparatus. The method may include communicating with at least one external speaker; displaying a control screen for the at least one external speaker; and controlling an operation of the external speaker according to a user operation input to the control screen. The controlling may include transmitting a control signal, which controls a content output apparatus to communicate with the external speaker according to an output mode corresponding to the type of the content output apparatus among a plurality of output modes, to the content output apparatus in response to the content output apparatus configured to provide an audio signal to the external speaker being selected in the control screen.

According to the above-described various exemplary embodiments, an optimum mode for selectively synchronizing a video signal and an audio signal of content with an audio signal of an external speaker may be automatically set or may be guided and set by the user, and thus convenience of the user may be increased.

BRIEF DESCRIPTION OF THE DRAWINGS

The above and/or other aspects will be more apparent by describing in detail exemplary embodiments, with reference to the accompanying drawings, in which.

DETAILED DESCRIPTION OF THE EXEMPLARY EMBODIMENTS

Figure 1:
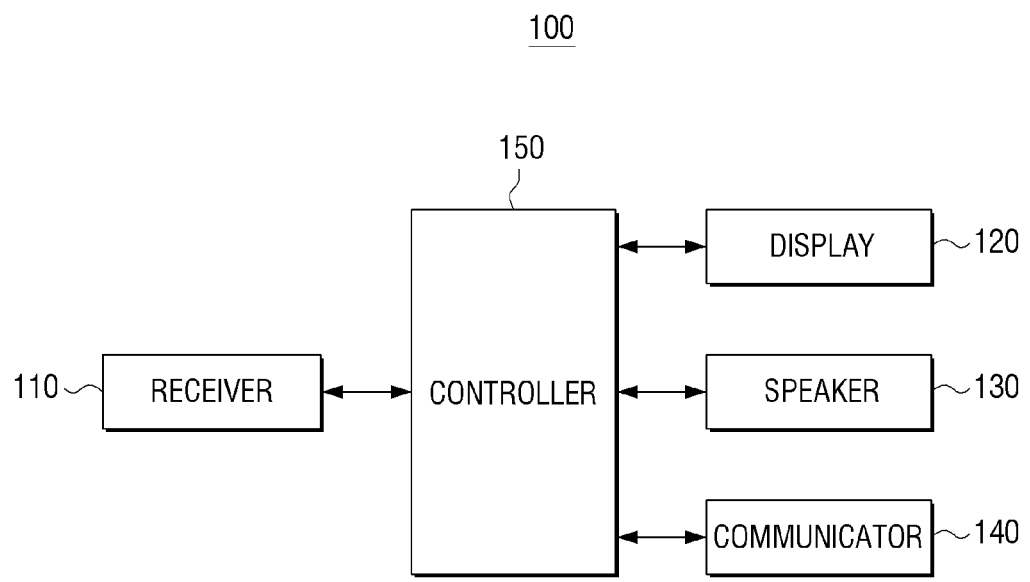
FIG. 1 is a block diagram illustrating a configuration of a content output apparatus according to an exemplary embodiment.

Hereinafter, exemplary embodiments will be described in more detail with reference to the accompanying drawings.

In the following description, the same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a block diagram illustrating a configuration of a content output apparatus according to an exemplary embodiment.

Referring to FIG. 1, a content output apparatus 100 includes a receiver 110, a display 120, a speaker 130, a communicator 140, and a controller 150. Here, the content output apparatus 100 may be implemented with various types of electronic apparatus or systems such as a TV, a Blu-ray disc (BD) player, a home theater, a MP3 player, a compact disc (CD) player, a smart phone, a tablet personal computer (PC), a desk top PC, or a laptop PC.

The receiver 110 receives content. For example, in an exemplary embodiment in which the content output apparatus 100 is a TV, the receiver 110 may be implemented with a tuner, a cable receiver, or a communicator. The receiver 110 may receive a broadcasting signal or an audio signal through the tuner. The broadcasting signal may include a video signal, an audio signal, and additional data (for example, electronic program guide (EPG) data). The receiver 110 may receive the broadcasting signal from various sources such as terrestrial broadcasting, cable broadcasting, satellite broadcasting, or Internet broadcasting.

In another exemplary embodiment in which the content output apparatus 100 is a laptop PC, the receiver 110 may be implemented with a communicator or a communication module, and may receive various pieces of content from an internet website or a server.

The display 120 outputs a video signal of the content. That is, the display 120 may display an image corresponding to the content. The image may include a still video image, a moving video image, document, a photograph, or the like. Thus, the display 120 may be implemented as a liquid crystal display (LCD), an organic light emitting display (OLED), a plasma display panel (PDP), or the like.

The speaker 130 outputs an audio signal of the content. That is, the speaker 130 may output the audio portion of the content. The speaker 130 may be implemented to be included in or attached to the content output apparatus 100. The speaker 130 may be implemented as a sound bar type of speaker that is located near the content output apparatus 100.

The communicator 140 transmits the audio signal of the content to at least one external speaker. Specifically, the communicator 140 may perform a connection operation to connect the content output apparatus 100 to the at least one external speaker. For example, the communicator 140 may couple the content output apparatus 100 to the at least one external speaker using various communication methods, such as a wired/wireless local area network (LAN), a wide area network (WAN), Ethernet, Bluetooth, Zigbee, a universal serial bus (USB) connection, IEEE 1394, or Wi-Fi. Further, the communicator 140 may also perform a connection operation to connect content output apparatus to various external apparatuses in addition to the external speaker. For this, the communicator 140 may include a chip, module, component, an input port, or the like corresponding to the communication methods. For example, in response to the communication being performed through a wired LAN method, the communicator 140 may include a wired LAN card (not shown) and an input port (not shown).

The controller 150 may determine whether the audio signal is related to the video signal, and display a user interface screen for inducing a selection of an output mode which transmits the audio signal to the at least one external speaker with a communication method corresponding to the determination result among a plurality of output modes via the display. That is, the controller 150 may display a user interface screen for inducing a selection of an appropriate output mode among a plurality of output modes by a user according to whether the audio signal is related to the video signal.

For example, if an audio signal is related to a video signal, a user may display a user interface screen for selecting an output mode which transmits an audio signal to at least one external speaker with a WiFi-direct communication method among a plurality of output modes by the user, and if an audio signal is not related to a video signal, the user may display a user interface screen for selecting an output mode which transmits an audio signal to at least one external speaker with a communication method using an access point (AP) among a plurality of output modes by the user.

As a result of a determination whether an audio signal is related to a video signal, if it is determined that an output mode selected by the user does not correspond to the determination result appropriately, the controller 150 may display a user interface (UI) for inducting to select an output mode corresponding to the determination result appropriately.

As a result of a determination whether an audio signal is related to a video signal, if it is determined that an output mode selected by the user does not correspond to the determination result appropriately, the controller 150 may operate automatically with an output mode corresponding to the determination result appropriately, and transmit an audio signal to at least one external speaker.

The plurality of output modes may be output modes that synchronize outputs of a video signal and an audio signal of content with an output of an audio signal of at least one external speaker. The plurality of output modes may be largely divided into two output modes.

The plurality of output modes may include a surround mode and a multi-room mode.

The surround mode is an output mode that transmits an audio signal corresponding to audio reproduced by a source device (e.g., the content output apparatus, such as a TV, reproduces audio that corresponds to the displayed video portion of the content, as in the soundtrack of a television program or movie viewed on the TV) to at least one external speaker, and performs synchronization between the video signal corresponding to the video of the content output apparatus and the audio signal transmitted to the at least one external speaker. Thus, the reproduction of the audio signal by the at least one external speaker can be synchronized with the reproduction of the video by the content output apparatus.

The surround mode may further include an output mode that performs synchronization among the video signal corresponding to the video of the content output apparatus, the audio signal output through the speaker 130 included in the content output apparatus, and the audio signal transmitted to the at least one external speaker. Thus, in this output mode the reproduction of both the video and audio at the content output apparatus is synchronized with the reproduction of audio by the at least one external speaker.

Further, in exemplary embodiments the surround mode may be understood as having the same meaning as AV Sync technology, Group Play, 1 room, or Direct Audio.

Specifically, in exemplary embodiments the surround mode is a technology that allows a user to listen to audio that is reproduced by at least one external speaker that is located within a distance of a signal transmitted through a Wi-Fi Direct method. The surround mode will be described in detail with reference to FIG. 2.

Figure 2:
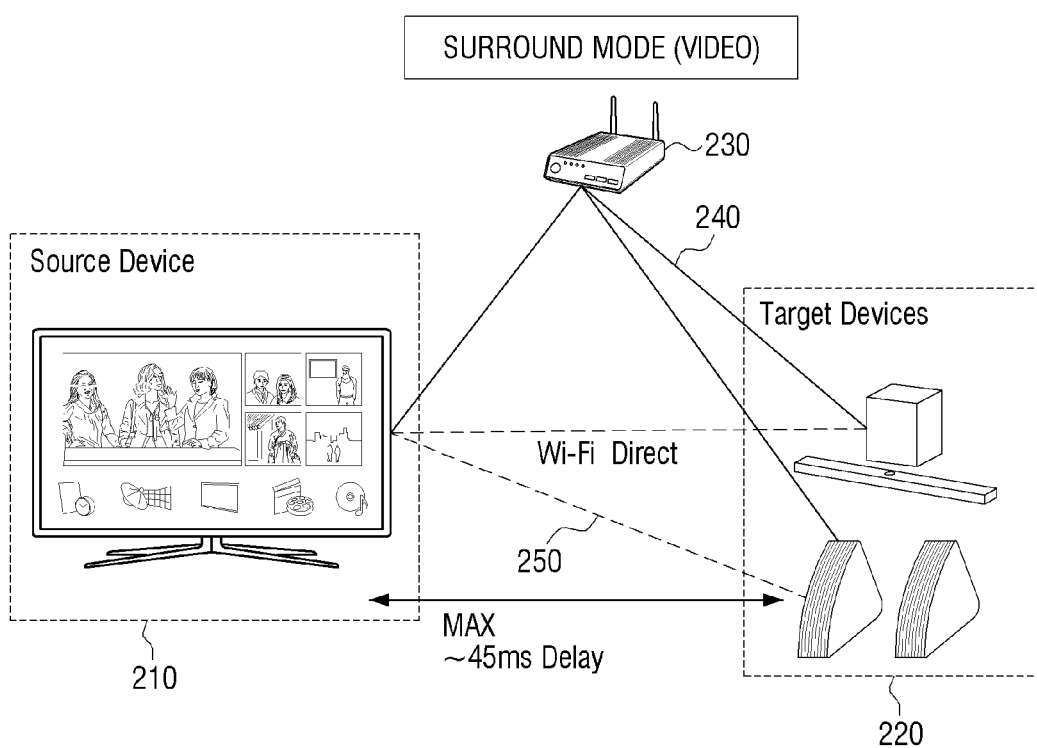
FIG. 2 is a view illustrating a surround mode according to an exemplary embodiment.

FIG. 2 is a view illustrating a surround mode according to an exemplary embodiment.

A TV as a source device 210, a sound bar and a plurality of external speakers as target devices 220, and a wireless router 230 serving as an access point (AP) are illustrated in FIG. 2.

The TV as the source device 210 performs wireless communication with the sound bar and the plurality of external speakers as target devices 220 through the wireless router 230. Although FIG. 2 depicts target devices 220 as including the sound bar and the plurality of external speakers, it is understood that the target device for wireless communication does not necessarily require all these devices, and in different exemplary embodiments the sound bar may be the only target device, one or more of the external speakers may be the target device or devices, and in other exemplary embodiments the sound bar and all external speakers may be target devices. A Wi-Fi method 240 may be used as the wireless communication method used to perform the wireless communication. In addition to the Wi-Fi method 240, a wireless communication method such as Bluetooth or Zigbee may be used, but the wireless communication method is not limited thereto.

Therefore, an audio signal corresponding to content being currently reproduced by the TV as the source device 210 is transmitted to the sound bar and the plurality of external speakers as target devices 220 through the wireless router 230.

However, in response to the TV as the source device 210 being operated in the surround mode, the audio signal corresponding to the content being currently reproduced is transmitted to the sound bar and the plurality of external speakers as target devices 220 not through the wireless router 230 but by using a Wi-Fi Direct method 250. The Wi-Fi Direct method allows devices to connect to one another directly without joining a traditional network. That is, the TV as the source device 210 may transmit the audio signal to the sound bar as the target device 220 and the plurality of external speakers without the wireless router 230. Although the Wi-Fi Direct method is described, it is understood that other connection methods may be utilized in other exemplary embodiments, in which the devices may communicate directly with each other without joining a traditional network.

Thus, the transmission delay generated in response to the audio signal being transmitted using the Wi-Fi Direct method 250 instead is reduced as compared with transmission delay generated in response to the delay that would be generated if the audio signal was transmitted using the Wi-Fi method 240 in which the audio signal would be transmitted through the wireless router 230. The transmission delay generated in response to the audio signal being transmitted using the Wi-Fi Direct method 250 instead of being transmitted through wireless router 230 may be up to 45 ms. Since a transmission delay of up to about 45 ms is an extremely small level in the context of synchronizing the audio signal and video signal of content output from the TV as the source device 210, the audio signal and video signal corresponding to the content output from the TV as the source device 210 will be in synchronization with the audio signals output through the sound bar and the plurality of speakers as target devices 220. That is, a delay of up to about 45 ms in audio reproduced by the external speakers as compared to the reproduction of audio and/or video by the TV is so small that the delay is not likely to be perceived by the viewer.

Thus, the surround mode may be applied to the case where the audio signal and the video signal corresponding to the content output from the content output apparatus 100 have to be in synchronization with the audio signals which are corresponding to the content transmitted from the content output apparatus 100 and output through a plurality of external speakers in the state in which the content output apparatus 100 and the plurality of external speakers are location in the same room. Therefore, the surround mode is an optimized mode in the case where the user mainly watches video through the content output apparatus 100 and listens to audio through the plurality of speakers.

An exemplary embodiment for implementing the surround mode will be described in detail with reference to FIG. 3.

Figure 3:
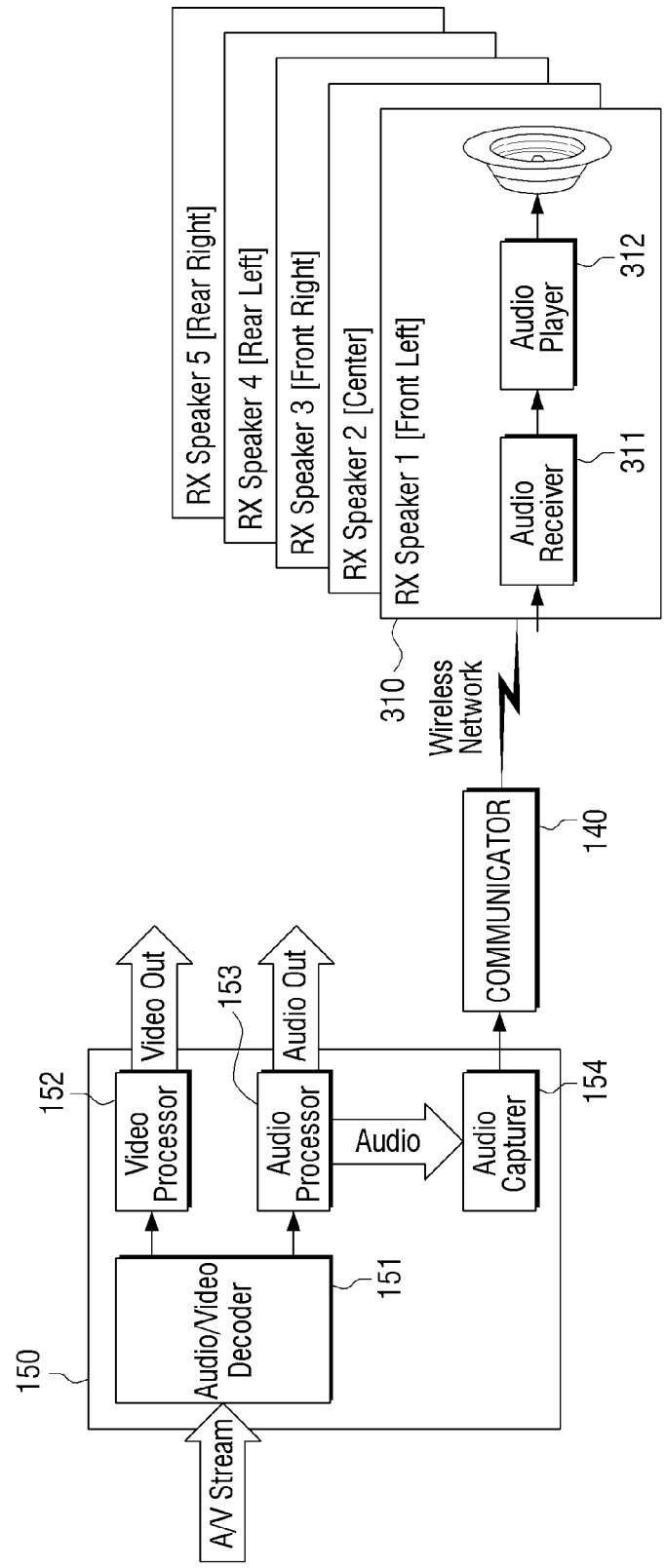
FIG. 3 is a block diagram illustrating a detailed configuration of a controller according to an exemplary embodiment.

FIG. 3 is a block diagram illustrating a detailed configuration of a controller according to an exemplary embodiment.

Referring to FIG. 3, the controller 150 may include an audio/video decoder 151, a video processor 152, an audio processor 153, and an audio capturer 154.

A receiver 310 of a speaker, that is, a RX speaker 1 310, is illustrated in FIG. 3 and configured to receive an audio signal, divide channels of the audio signal according to speakers (e.g., by separating channels of surround sound content in accordance with the respective speaker that will output a particular channel), and reproduce the audio signal. RX speakers 2, 3, 4, and 5 have the same configuration as the RX speaker 1 and perform the same processing operation as the RX speaker 1 310, and thus only the description for the RX receiver 1 310 will be made. In an exemplary embodiment, RX speakers 1, 2, 3, 4, and 5 are speakers used in a surround sound operation and each speaker reproduces a specified channel of the surround sound audio content.

The RX speaker 1 310 includes an audio receiver 311 and an audio player 312.

The audio/video decoder 151 decodes a video signal and an audio signal, the video processor 152 processes picture quality of the decoded video signal, and the audio processor 153 processes sound quality of the decoded audio signal.

The audio capturer 154 may periodically capture the audio signal in real time simultaneously in response to the audio signal being decoded by the audio/video decoder 151.

The communicator 140 adds a meta data header including time information and codec information to the audio signal captured in the audio capturer 154, and transmits the audio signal with the added meta data header.

The audio receiver 311 of the RX speaker 1 310 may receive the audio signal from the communicator 140, analyze the meta data header added to the audio signal, and detect the time information and codec information related to the captured audio signal.

The audio player 312 may reproduce an audio signal of a channel corresponding to the RX speaker 1 310 through synchronization with audio signals of the other external speakers 2, 3, 4, and 5 based on the detected time information and codec information.

In particular, to operate in the surround mode, the content output apparatus 100 has to output a video signal and an audio signal corresponding to content and simultaneously the content output apparatus 100 has to transmit the audio signal to the external speaker. This may be implemented by decoding the audio signal through the audio/video decoder 151, and simultaneously by periodically capturing the audio signal in real time through the audio capturer 154 and transmitting the captured audio signal to the external speaker 310 through the communicator 140.

The method of processing the audio signal will be described in detail with reference to FIG. 4.

Figure 4:
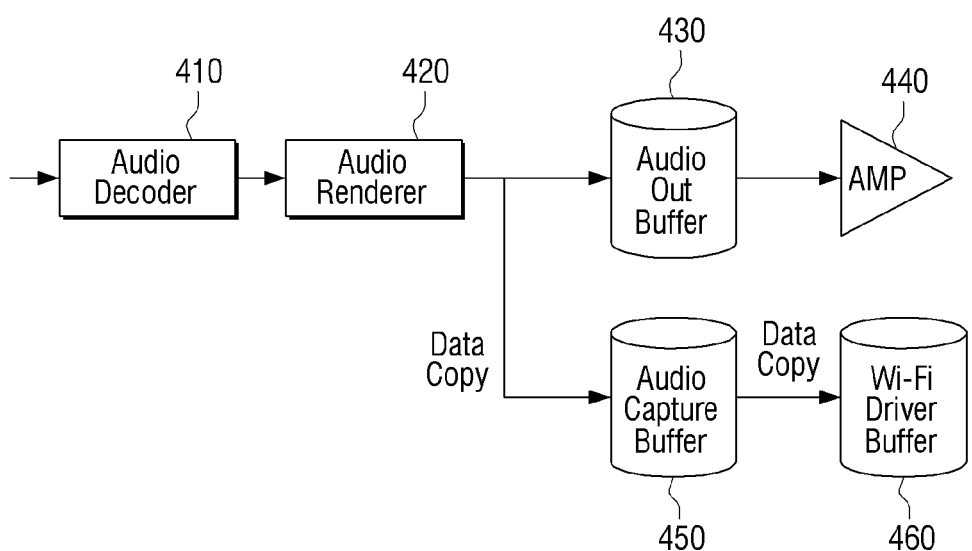
FIG. 4 is a block diagram illustrating a process of processing an audio signal according to an exemplary embodiment.

FIG. 4 is a block diagram illustrating a process of processing an audio signal according to an exemplary embodiment.

Referring to FIG. 4, an audio decoder 410 may correspond to the audio/video decoder 151 of FIG. 3, and an audio renderer 420 may correspond to the audio processor 153 of FIG. 3.

An audio signal output through the audio renderer 420 may be buffered in an audio output buffer 430, and simultaneously output through an amplifier 440. At the same time, the audio signal output through the audio renderer 420 may be periodically copied and buffered in the auto capture buffer 450. The audio signal buffered in the audio capture buffer 450 may be periodically copied again and streamed to a Wi-Fi driver buffer 460. The Wi-Fi driver buffer 460 may transmit the streamed audio signal to the external speaker through a Wi-Fi Direct method.

Through the method of processing an audio signal illustrated in FIG. 4, the controller 150 of the content output apparatus 100 may simultaneously perform decoding of the audio signal and periodic capturing of the audio signal. Therefore, the controller 150 may output the video signal and the audio signal corresponding to the content, and simultaneously transmit the audio signal to the external speaker.

The audio decoder 410 illustrated in FIG. 4 may set an audio signal other than or in addition to a 5.1 channel to be output in a bit stream (element stream). Therefore, even in response to the audio signal other than or in addition to a 5.1 channel being decoded, an original sound may be captured as it is, and then transmitted to the Wi-Fi driver buffer 460. Here, "bit stream" is one of methods for converting digital audio data into an analog signal, and the digital audio data may be converted into an analog signal by one bit through a bit stream D/A converter.

In response to the streamed audio signal being transmitted to an external speaker by the Wi-Fi driver buffer 460 through a Wi-Fi Direct method, the Wi-Fi driver buffer 460 may transmit the audio signal through a layer that is below layer 2 (i.e., below the Data Link layer) of the seven layers of the Open System Interconnection (OSI) model, and thus the transmission delay may be reduced. The method of reducing the transmission delay will be described later.

The operations performed in the audio decoder 410, the audio renderer 420, the audio output buffer 430, the audio capture buffer 450, and the Wi-Fi driver buffer 460 may be implemented with a program and executed, and may be implemented with modules in the controller 150.

Figure 5:
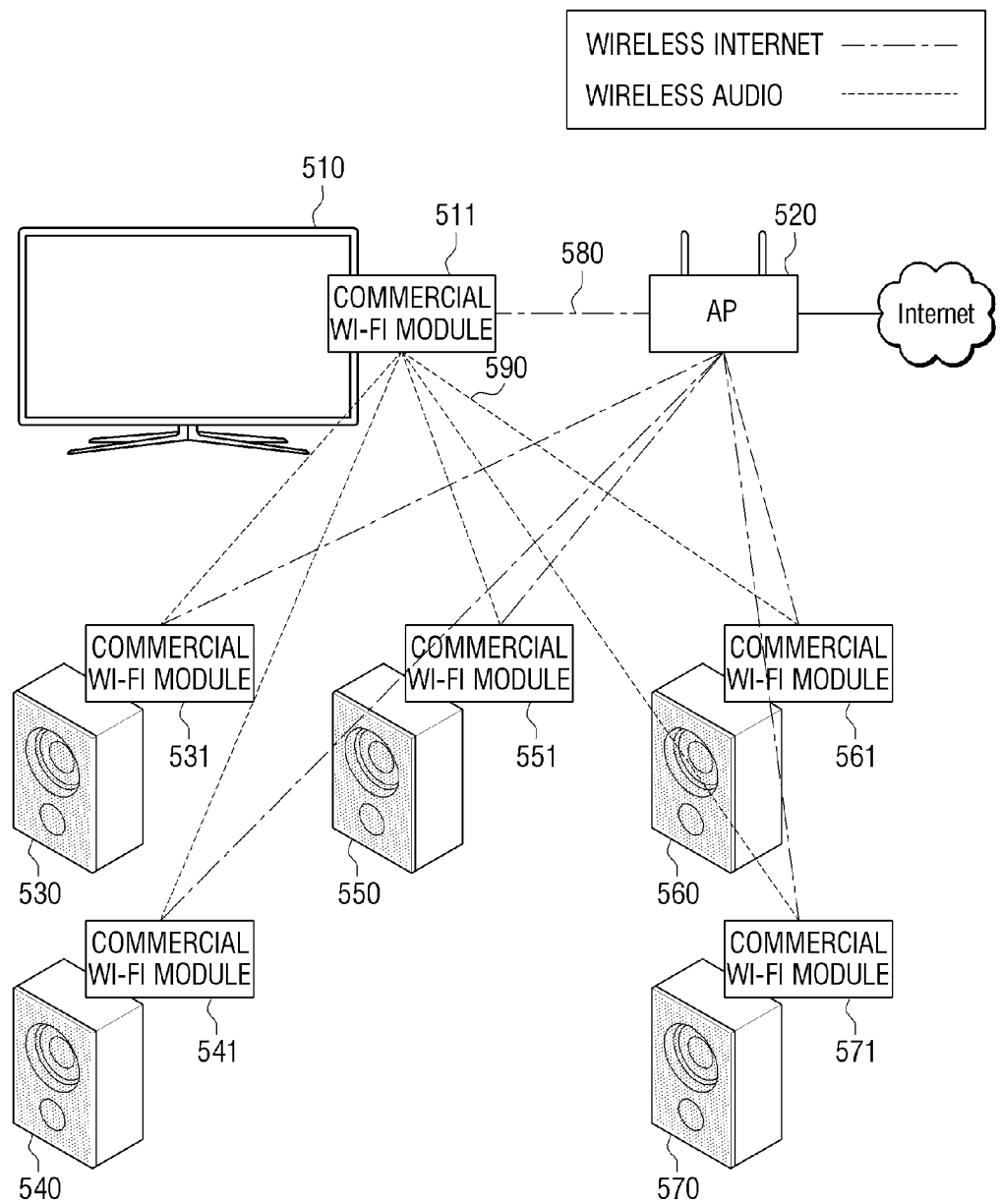
FIG. 5 is a view illustrating a surround mode implemented through a TV as a content output apparatus and a plurality of external speakers according to an exemplary embodiment.

FIG. 5 is a view illustrating that the surround mode is implemented through a TV as a content output apparatus and a plurality of external speakers according to an exemplary embodiment.

Referring to FIG. 5, a TV 510 as the content output apparatus 100 and a plurality of external speakers 530, 540, 550, 560, and 570 include only commercial Wi-Fi modules 511, 531, 541, 551, 561, and 571, and do not include a separate wireless receiving apparatus.

That is, the TV 510 and the plurality of external speakers 530 to 570 may perform wireless communication 580 through a wireless router 520 as an access point (AP), and the wireless communication 580 may include Wi-Fi.

The TV 510 and the plurality of external speakers 530 to 570 may exchange an audio signal without the wireless router 520, and at this time, a Wi-Fi Direct method 590 may be used. In response to the TV 510 being operated in the surround mode, the TV 510 and the plurality of external speakers 530 to 570 may transmit and receive the audio signal without using the wireless router 520 but instead by using the Wi-Fi Direct method 590, which enables the TV 510 to communicate with the external speakers 530 to 570 directly.

The TV 510 may output a video signal and simultaneously transmit the audio signal with reduction in the transmission delay. Therefore, the video signal is in synchronization with the audio signals output through the plurality of speakers, and only the audio signal may be divided into a 5.1 channel through the plurality of external speakers 530 to 570 illustrated in FIG. 5 and then output.

In response to the communication being performed using a Wi-Fi Direct method, the method of reducing the transmission delay will be described in detail with reference to FIG. 6.

Figure 6:
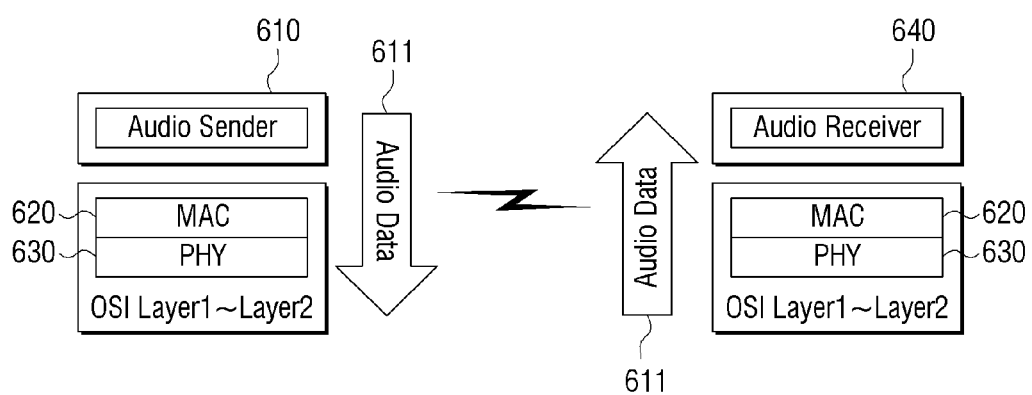
FIG. 6 is a view illustrating a process of processing and transmitting an audio signal to reduce transmission delay according to an exemplary embodiment.

FIG. 6 is a view illustrating a process of processing an audio signal and transmitting the processed audio signal to reduce transmission delay according to an exemplary embodiment.

Referring to FIG. 6, in response to a decoded audio signal 611 output from an audio decoder being captured and transmitted to an external speaker corresponding to an audio receiver 640 through a media access control (MAC) layer 620, which is a sub layer of Data Link layer 2 in the seven layer OSI model, and a physical layer 630 (i.e., layer 1 in the OSI model) together with a MAC address in a Wi-Fi driver stage, the controller 150 of the content output apparatus 100 corresponding to an audio sender 610 outputs the received audio signal 611 to the external speaker through the physical layer 630 and the MAC layer 620 in reverse order to the order of transmission of the decoded audio signal 611.

In response to data being transmitted to a wireless router from an application layer according to the OSI seven layer model and then the data being transmitted from the wireless router to an external speaker in order to transmit the data on an existing wireless network, the transmitted data is retransmitted through the OSI application layer. However, in the process illustrated in FIG. 6, the data is not transmitted through all seven layers of the OSI model, as the transmission only involves the Physical layer (layer 1) and the MAC sub layer of the Data Link layer (layer 2). Therefore, the time required for processing the data in the wireless router such as an AP may be reduced, and thus transmission delay may be reduced.

Figure 7:
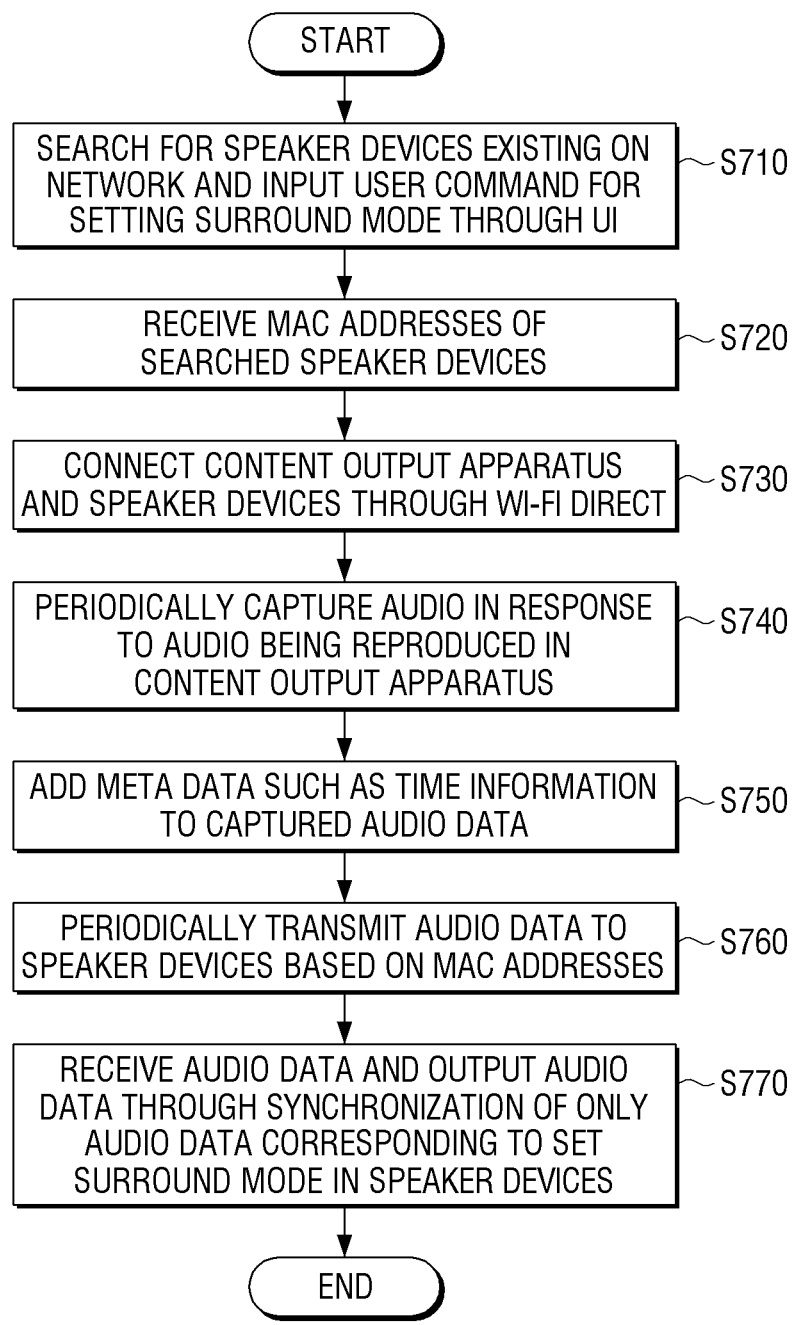
FIG. 7 is a flow chart illustrating a process of transmitting and receiving an audio signal between a content output apparatus and an external speaker in a surround mode according to an exemplary embodiment.

FIG. 7 is a flow chart illustrating a process of transmitting and receiving an audio signal between a content output apparatus and an external speaker in a surround mode according to an exemplary embodiment.

Referring to FIG. 7, in response to searching for speaker devices existing on a network, and a user command for setting the surround mode being received through a user interface (UI) (S710), the controller 150 may receive MAC addresses of the searched speaker devices (S720).

The controller 150 couples the content output apparatus 100 to the speaker devices through a Wi-Fi Direct method (S730), and periodically captures audio in response to the audio being reproduced in the content output apparatus 100 (S740).

The controller 150 adds meta data such as time information to the captured audio data (S750), and in response to the audio data being periodically transmitted to the speaker devices on the basis of the MAC addresses (S760), the speaker devices receive the audio data and perform synchronization on only audio data corresponding to the set surround mode, and output the synchronized audio data (S770).

The multi-room mode among a plurality of output modes is an output mode that synchronizes an audio signal output from a speaker included in a source device with an audio signal output from an external speaker even if the output of the received audio signal by the external speaker is delayed due to transmission delay resulting from the transmission of the audio signal to the external speaker, which is coupled in a wireless or wired manner.

That is, the multi-room mode is an output mode that synchronizes the audio signal output from the speaker 130 included in the content output apparatus with an audio signal output through at least one external speaker when a video signal is not being output by the content output apparatus 100 but only the audio signal is being output.

Further, in exemplary embodiments the multi-room mode may be understood as having the same meaning as AA sync technology, Party play, or Zone Play.

That is, the multi-room mode is an output mode that transmits an audio signal to a plurality of speaker devices located some distance away over a network connection that includes a wireless router and performs synchronization on audio signals that are reproduced by the speaker devices even in the case of a transmission delay being present when the speaker devices are located a long distance away from the point of transmission. The multi-room mode may be also used to perform synchronization on audio signals that are output from a plurality of speakers that may be located in different rooms.

Figure 8:
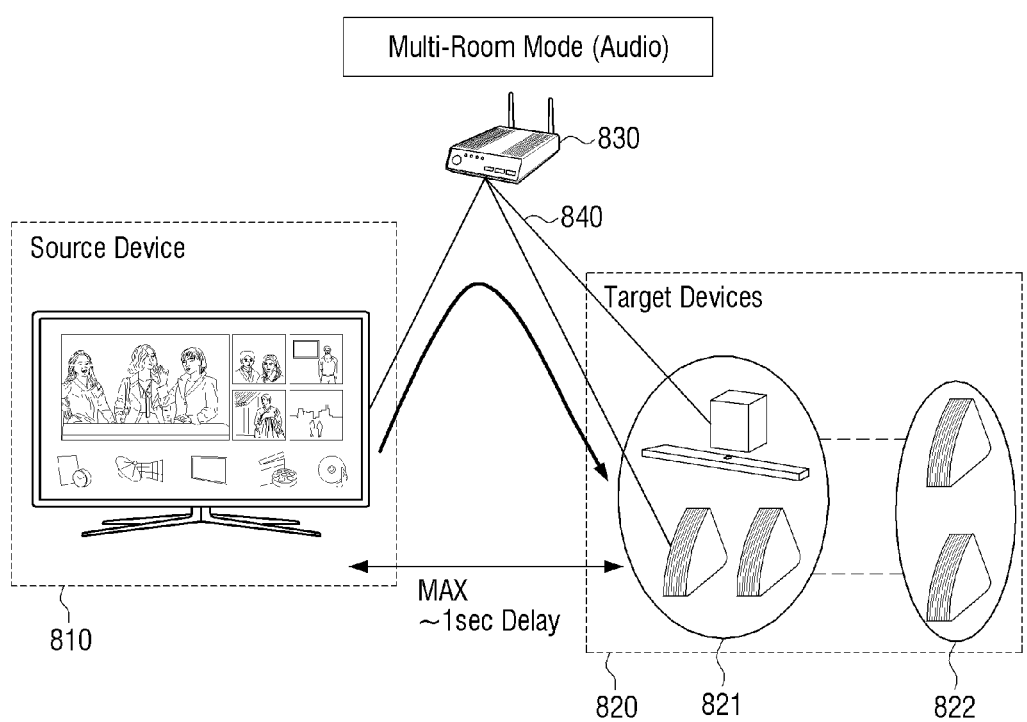
FIG. 8 is a view illustrating a multi-room mode according to an exemplary embodiment.

FIG. 8 is a view illustrating a multi-room mode according to an exemplary embodiment.

Referring to FIG. 8, a TV as a source device 810, a sound bar and a plurality of external speakers as target devices 820, and a wireless router 830 serving as an access point (AP) are illustrated.

The TV as the source device 810 may perform wireless communication with the sound bar and the plurality of speakers as target devices 820 through the wireless router 830. Although FIG. 8 depicts target devices 820 as including the sound bar and the plurality of external speakers, it is understood that the target device for wireless communication does not necessarily require all these devices, and in different exemplary embodiments the sound bar may be the only target device, one or more of the external speakers may be the target device or devices, and in other exemplary embodiments the sound bar and all external speakers may be target devices. A Wi-Fi method 840 may be primarily used as the wireless communication method used herein. In addition, the wireless communication method such as Bluetooth or Zigbee may be used, but the wireless communication method is not limited thereto.

In response to the TV as the source device 810 being operated in the multi-room mode, an audio signal corresponding to content being currently reproduced is transmitted to the sound bar and the plurality of external speakers as target devices 820 through the wireless router 830, and transmission delay may be generated up to 1 second.

The TV as the source device 810 may perform delay processing on the audio signal corresponding to the content and output the delay-processed audio signal. That is, the TV as the source device 810 may perform delay processing on the audio signal by the transmission delay generated in response to the audio signal being transmitted to one or more target devices 820, and output the delay-processed audio signal. Thus, the output of the audio signal at the source device may be delayed by an amount sufficient to account for the delay resulting from transmission of the audio to a target device.

In response to the audio signal being delay-processed and output by the TV as the source device 810, the audio signal output from a speaker included in the TV as the source device 810 will be in synchronization with the audio signals output from the sound bar and the plurality of external speakers as target devices 820.

A portion of the plurality of external speakers, for example, a speaker 821 may re-transmit the audio signal received from the source device 810 to another speaker 822. The one speaker 821 of the plurality of external speakers that re-transmits the audio signal may perform delay processing on the audio signal to account for the delay in transmission to the other speaker 822, and output the delay-processed audio signal.

Thus, the audio signal output through the one speaker 821 of the plurality of speakers will be in synchronization with the audio signal output through the other speaker 822, which receives the audio signal from the one speaker 821. The audio signal may be transmitted farther away through the communication method that connects the speakers.

The multi-room mode is a mode that is optimized in a case where the user does not watch video through the content output apparatus 100, but instead listens to audio through a plurality of external speakers that are located in different rooms (e.g., a multi-room speaker configuration where the speakers can be grouped to play the same content).

Hereinafter, a method of performing synchronization between a video signal and an audio signal output from the content output apparatus and an audio signal output from an external speaker according to the surround mode and the multi-room mode will be described, and two exemplary embodiments for the multi-room mode will be described.

Figure 9:
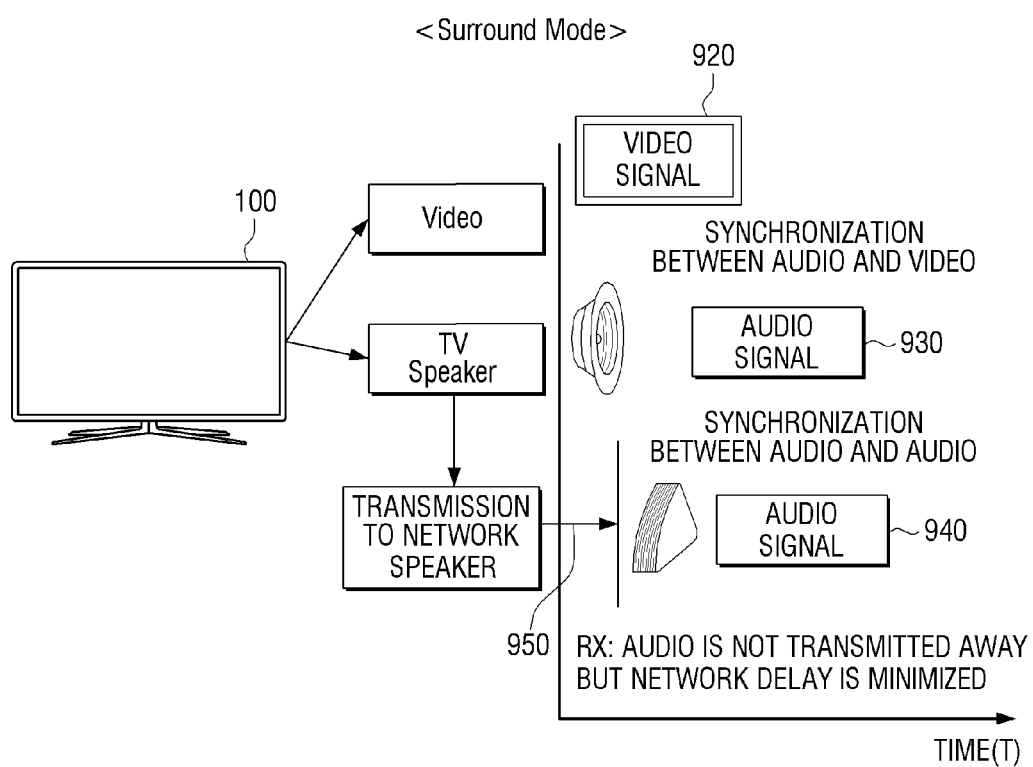
FIGS. 9 to 11 are views illustrating outputs of a video signal and an audio signal of a content output apparatus and an output of an audio signal of an external speaker according to a surround mode and a multi-room mode according to exemplary embodiments.
Figure 10:
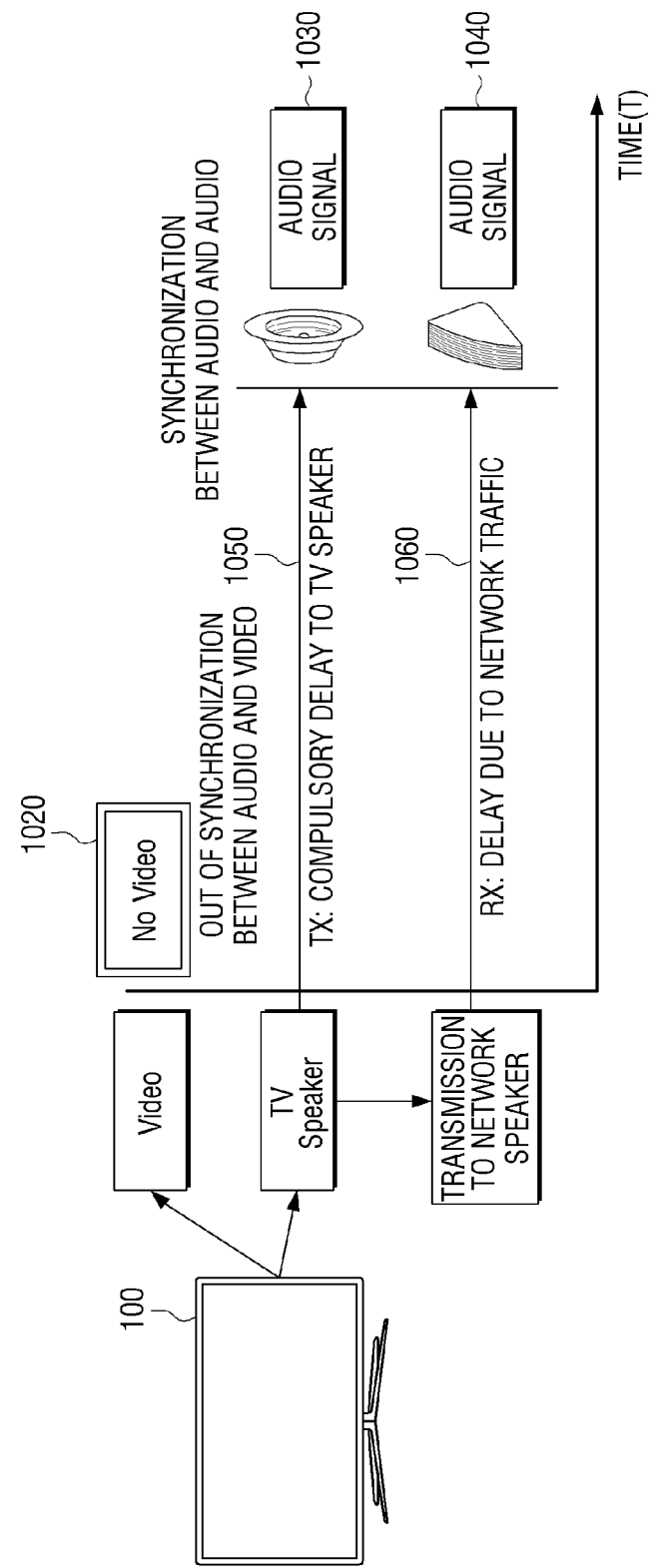
Figure 11:
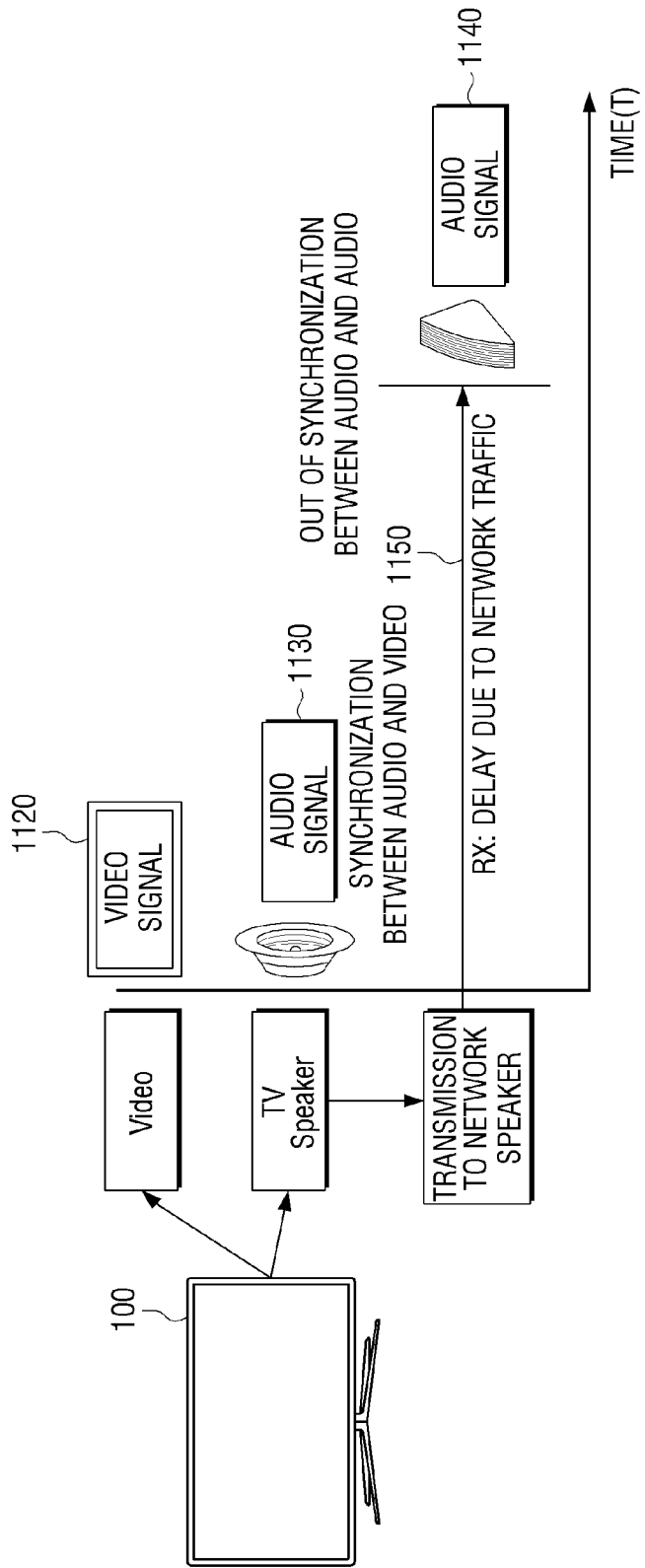

FIGS. 9 to 11 are views illustrating outputs of a video signal and an audio signal of the content output apparatus and an output of an audio signal of an external speaker according to a surround mode and a multi-room mode according to exemplary embodiments.

FIG. 9 illustrates the outputs of the video signal and the audio signal of the content output apparatus and the output of the audio signal of the external speaker in the surround mode in which no transmission delay exists or the transmission delay is minimal. The content output apparatus 100 outputs a video signal 920 corresponding to content through the display 120, and outputs an audio signal 930 corresponding to the content through the speaker 130. The content output apparatus 100 transmits the audio signal 940 corresponding to the content to a network speaker using a Wi-Fi Direct method.

With reference to the horizontal axis of FIG. 9, which represents time, the point in time for starting the output of the video signal 920 output by the display 120 is the same as point in time for starting the output of the audio signal 930 output by the speaker 130.

Transmission delay 950 may be generated in which the starting point in time of outputting an audio signal 940 is delayed as a result of the signal being transmitted using a W-Fi Direct method and output by an external speaker. In response to the generated transmission delay being up to about 45 ms, the starting point in time of the audio signal 940 being output may be correspondingly delayed up to about 45 ms. However, even in response to the starting point in time of the output of audio signal 940 being delayed due to the transmission delay of about 45 ms, the delay is so small that it cannot be perceived by the user.

Therefore, the video signal 920 output through the display 120 of the content output apparatus 100, the audio signal 930 output through the speaker 130 of the content output apparatus, and the audio signal 940 output through the external speaker may be in synchronization, and thus the surround mode may be realized.

FIG. 10 illustrates outputs of an audio signal of the content output apparatus 100 and an audio signal of an external speaker in a multi-room mode 1 in which transmission delay occurs. The multi-room mode 1 illustrated in FIG. 10 is a multi-room mode in which a video signal is not output by the content output apparatus 100.

Specifically, the video signal corresponding to content is not output from the content output apparatus 100, as indicated by No Video 1020. An audio signal 1030 corresponding to the content is output through the speaker 130, and also transmitted to a network speaker using a wireless communication method such as a Wi-Fi method.

The content output apparatus 100 may perform delay processing 1050 on the audio signal 1030 corresponding to the content, and delay an output starting point of time of the audio signal 1030 output by the speaker 130. An output starting point of time of an audio signal 1040 output through the external speaker may be delayed by transmission delay 1060. If a wireless communication method is used that is not a direct communication method such as not the WI-Fi Direct method but another method such a conventional Wi-Fi communication, the transmission delay may be up to 1 second. Therefore, the output starting point of time of the audio signal 1040 output through the external speaker may be correspondingly delayed up to 1 second.

The content output apparatus 100 may perform the delay processing 1050 on the audio signal 1030 corresponding to the content by up to 1 second and output the delayed audio signal through the speaker 130. Accordingly, the audio signal 1030 output through the speaker 130 will be in synchronization with the audio signal 1040 output through the external speaker, and the multi-room mode 1 may be realized.

FIG. 11 illustrates outputs of an audio signal and a video signal of the content output apparatus 100 and an output of an audio signal of an external speaker in a multi-room mode 2 in which transmission delay occurs. The multi-room mode 2 illustrated in FIG. 11 is a multi-room mode in response to a video signal being output from the content output apparatus 100 among multi-room modes.

Specifically, the content output apparatus 100 outputs a video signal 1120 corresponding to content through the display 120, outputs an audio signal 1130 corresponding to the content through the speaker 130, and also transmits the audio signal 1130 corresponding to the content to a network speaker using a wireless communication method such as a Wi-Fi method.

The video signal 1120 corresponding to the content output through the display 120 is in synchronization with the audio signal 1130 corresponding to the content output by the speaker 130. However, the starting point in time of outputting the audio signal 1140 corresponding to the content output by the external speaker may be delayed by transmission delay 1150, and thus the audio signal 1140 output through the external speaker will not be in synchronization with the video signal 1120 output through the display 120 and the audio signal 1130 output through the speaker 130.

If a wireless communication method is used that is not a direct communication method such as the WI-Fi Direct method but another method such as conventional Wi-Fi as in FIG. 10, the transmission delay 1150 may be up to 1 second, and the output starting point of time of the audio signal 1140 output through the external speaker may be correspondingly delayed up to 1 second.

The multi-room mode 2 is an output mode that may be applied to a case where a first user watches video and listens to audio through a TV that is located in one room, and a second user only listens to the audio that is reproduced by a speaker located in a different room.

The above-described surround mode, multi-room mode 1, and multi-room mode 2 may be referred to as a first output mode, a second output mode, and a third output mode, respectively, according to an exemplary embodiment.

The controller 150 may be optionally operated in one output mode among a plurality of output modes. Specifically, the controller 150 may control the display 120 and the speaker 130 to output a video signal and an audio signal through synchronization with an audio signal output operation of at least one external speaker in the first output mode among the plurality of output modes.

That is, in response to the audio signal of the at least one external speaker being output without transmission delay or being delayed and output by transmission delay that cannot be perceived by the user, the controller 150 may output the video signal and the audio signal through the synchronization with the audio signal output operation of at least one external speaker in the surround mode corresponding to the first output mode as illustrated in FIG. 9.

The reason that no transmission delay exists or transmission delay is so small that is not noticeable in the surround mode has been previously described, and thus detailed description thereof will not be repeated.

Because the starting point in time of outputting the audio signal of the at least one external speaker is delayed by a transmission delay that cannot be perceived by the user or there is no transmission delay, even in response to the video signal and the audio signal being output by simultaneously controlling the display 120 and the speaker 130 through the controller 150 without purposely addressing the audio signal output operation of the at least one external speaker, the audio signal reproduced by the at least one external speaker will be synchronized with the output of the video signal.

The controller 150 may control the speaker 130 to output the audio signal through the synchronization with the audio signal output operation of the at least one external speaker in the second output mode among the plurality of output modes.

That is, in the multi-room mode 1 corresponding to the second output mode, as illustrated in FIG. 10, no video signal is output through the display 120 of the content output apparatus 100, and the starting point in time of outputting the audio signal by the at least one external speaker is delayed due to the transmission delay. The generated transmission delay may be up to 1 second, and the starting point in time of outputting the audio signal by the at least one external speaker may also be delayed up to 1 second.

Therefore, the controller 150 may compulsorily delay (for example, by introducing a delay by buffering the signal) the audio signal output through the speaker 130 by a delay amount corresponding to the starting point in time of outputting the audio signal output by the at least one external speaker so that the audio signal output by the speaker 130 is in synchronization with the audio signal output by the at least one external speaker, and then output the synchronized audio signals.

If it is determined that the audio signal is related to the video signal, the controller 150 may operate in the first output mode, and if it is determined that the audio signal is not related to the video signal, the controller 150 may operate in the second output mode. Especially, if it is determined that the audio signal is related to the video signal, even though a user manipulation for selecting the second output mode is input via the user interface screen, the controller 150 may display a UI for inducing to select the first output mode or operate in the first output mode.

If it is determined that the audio signal is related to the video signal, the controller 150 may activate a UI for selecting the first output mode and deactivate a UI for selecting the second output mode in the user interface screen. Accordingly, a user may be induced to select the first output mode in the user interface screen.

Likewise, if it is determined that the audio signal is not related to the video signal, the controller 150 may deactivate a UI for selecting the first mode and activate a UI for selecting the second output mode in the user interface screen. Accordingly, a user may be induced to select the second output mode in the user interface screen.

The UI for inducing a selection of a user regarding an output mode may be implemented as an on screen display (OSD), a graphic user interface (GUI) and the like, and display the UI.

If a content includes a video signal, the controller 150 may determine that an audio signal is related to a video signal, and if a content does not include a video signal, the controller 150 may determine that an audio signal is not related to a video signal. This feature will be described later.

The controller 150 may identically apply the operation which displays a user interface screen for inducing a selection of a user as described above to the third output mode which will be described later.

The controller 150 may transmit the audio signal to at least one external speaker, and control the display 120 and the speaker 130 to output the video signal and the audio signal in synchronization with the video signal while the audio signal output operation by the at least one external speaker is performed separately in the third output mode among the plurality of output modes.

That is, in the multi-room mode 2 corresponding to the third output mode, as illustrated in FIG. 11, the video signal output by the display 120 of the content output apparatus 100 exists, and the output starting point of time of the audio signal output by the at least one external speaker is delayed due to the transmission delay. The generated transmission delay may be up to 1 second, and the output starting point of time of the audio signal output by the at least one external speaker may be correspondingly delayed up to 1 second.

However, the controller 150 may output the video signal output through the display 120 and the audio signal output through the speaker 130 not through the synchronization with the audio signal output operation of the at least one external speaker but through the synchronization of the video signal and the audio signal reproduced by the content output apparatus 100. That is, the audio signal output through the speaker 130 of the content output apparatus and the audio signal output through the at least one external speaker may be output with a time difference.

The controller 150 may control the communicator 140 to perform communication with the at least one external speaker in the first output mode through a second communication method different from a first communication method in the second and third output modes.

Specifically, the controller 150 may perform communication with the at least one external speaker in the surround mode corresponding to the first output mode through the communication method different from the communication method used in the multi-room mode 1 and the multi-room mode 2.

Thus, in response to the operation of the controller 150 being changed from the second output mode or the third output mode to the first output mode, that is, from the multi-room mode 1 or the multi-room mode 2 to the surround mode, the communication method with the at least one external speaker is also changed.

The controller 150 may control the communicator 140 to perform communication with the at least one external speaker in the first output mode through a Wi-Fi Direct method, and to perform communication with the at least one external speaker in the second out mode and the third output mode through a Wi-Fi method (e.g., not using a Wi-Fi Direct method).

That is, the controller 150 may control the communicator 140 to perform communication with the at least one external speaker in the surround mode corresponding to the first output mode through the Wi-Fi Direct method, and to perform communication with the at least one external speaker in the multi-room mode 1 and the multi-room mode 2 corresponding to the second output mode and the third output mode through the Wi-Fi method.

The Wi-Fi Direct method and the Wi-Fi method have been previously described, and it has been described that different communication methods are used according to the output modes. Thus, detailed description thereof will not be repeated.

The controller according to an exemplary embodiment may be operated in the first output mode in response to a video signal being included in content, and operated in the second output mode in response to the video signal not being included in the content.

Specifically, the controller 150 may determine whether or not the video signal is included in the content. The controller 150 may determine whether or not the video signal is included in the content based on the kind or type of another apparatus coupled to the content output apparatus 100. Further, the controller 150 may determine whether or not the video signal is included in the content based on a file name extension for the content.

For example, in response to "midi" or "mp3" being included in the file name extension for the content, the controller 150 may check whether the file name extension indicates that the content is a file for music reproduction, and determine that the video signal is not included in the content. In response to "avi" being is included in the file name extension for the content, the controller 150 may check whether the file name extension indicates that the content is a file for moving image reproduction, and determine that the video signal is included in the content.

The controller 150 may determine whether or not the video signal is included in the content based on codec information related to the content or meta data added to the content, which indicates the kind of content.

The controller 150 may be operated in the first output mode that outputs the video signal and simultaneously performs synchronization between the video signal and the audio signal output by the speaker 130 and the audio signal output through the external speaker in response to the video signal being included in the content. The controller may be operated in the second output mode which compulsorily delays the audio signal output by the speaker 130 and outputs the delayed audio signal output through the speaker 130 in such a manner that the audio signal output by the speaker 130 is in synchronization with the audio signal output by the external speaker in response to the video signal not being included in the content.

The controller 150 may determine whether or not the video signal is included in the content based on the kind or type of another apparatus coupled to the content output apparatus 100, and an exemplary embodiment of the determination method will be described in detail with reference to FIG. 12.

Figure 12:
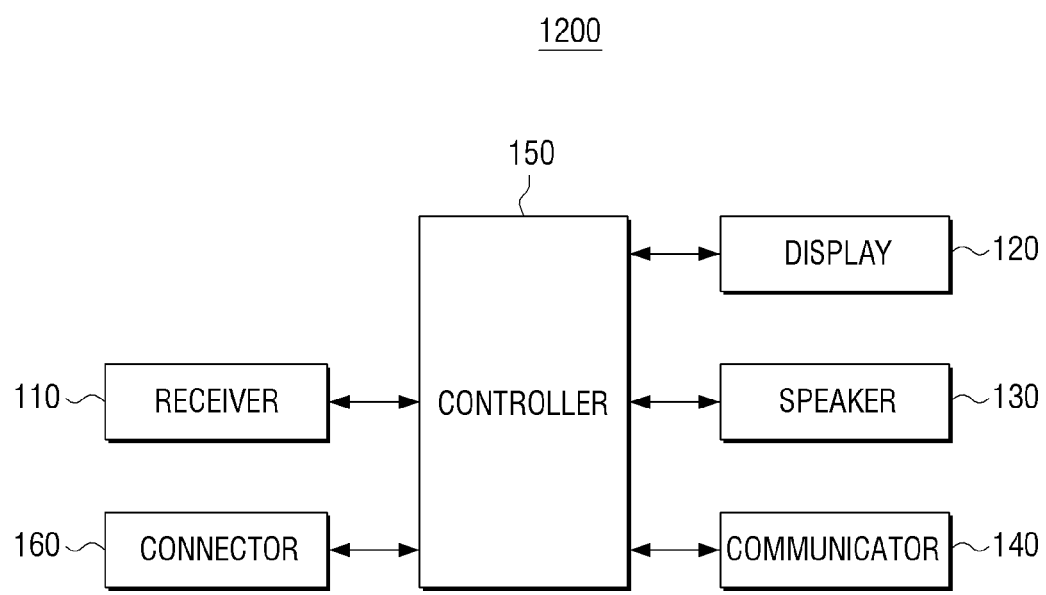
FIG. 12 is a block diagram illustrating a configuration of a content output apparatus according to another exemplary embodiment.

FIG. 12 is a block diagram illustrating a configuration of a content output apparatus according to another exemplary embodiment.

Referring to FIG. 12, a content output apparatus 1200 includes a receiver 110, a display 120, a speaker 130, a communicator 140, a controller 150, and a connector 160. The configurations and operations of the receiver 110, the display 120, the speaker 130, and the communicator 140 are the same as those of the receiver 110, the display 120, the speaker 130, and the communicator 140 illustrated in FIG. 1, and thus detailed description thereof will not be repeated.

The connector 160 may be coupled to a source device configured to provide content. That is, the content output apparatus 1200 may be coupled to another source device through the connector 160, and may receive the content from the other source device through the connector 160.

For example, it may be assumed that a TV as the content output apparatus is coupled to a Universal Serial Bus (USB) device including a music file or a CD player through the connector 160. Alternatively, it may be assumed that a set-top box as the content output apparatus is coupled to a TV through the connector 160.

The controller 150 may determine whether or not a video signal is included in the content based on the kind or type of source device coupled through the connector 160. Specifically, in response to the TV as the content output apparatus 1200 being coupled to the CD player through the connector 160, the controller 150 may check that a source device coupled through the connector 160 is the CD player, and the controller 150 may determine that a video signal is not included in content output from the CD player since the CD player is a type of source device that reproduces audio (e.g., music). In other words, the CD player would be determined to be an audio only type of source device. The controller 150 may be operated in the second output mode, that is, the multi-room mode 1 in response to determining that the video signal is not included in the content.

In response to a set-top box as the content output apparatus 1200 being coupled to a TV through the connector 160, the controller 150 may check that a source device coupled through the connector 160 is the TV, and determine that a video signal is included in content output from the TV since the TV is a video reproduction apparatus, or a type of device that supplies both video and audio. The controller 150 may be operated in the first output mode, that is, the surround mode in response to being determined that the video signal is included in the content.

In response to a BD player or a digital versatile disc (DVD) player being connected through the connector, since the BD player and the DVD player are mainly video reproduction apparatuses, the controller 150 may determine that a video signal is included in content output from the BD player or the DVD player.

The controller 150 may determine whether or not a video signal is included in content by considering the kind or type of source device coupled to the content output apparatus as well as a filename extension for the content.

For example, in response to a TV as the content output apparatus 1200 being coupled to a USB device through the connector 160, since the USB device may include both a music file and a moving image file, the controller 150 may be unable to determine whether or not a video signal is include in content based on only the fact that the USB device is connected. Therefore, the controller 150 may determine whether or not the video signal is included in the content by considering a filename extension for the content provided from the USB device coupled through the connector 160 together with the kind or type of USB device.

In response to content being changed by the user, for example, in response to the user being watching a movie on a TV and then downloading a music file through Internet and reproducing music with the TV, the controller 150 may determine whether or not a video signal is included in content based on a filename extension for the currently output content. In response to the movie being displayed by the TV, and then the music being reproduced by the TV, since the content output by the TV is changed from content in which a video signal is included to content in which no video signal is included, the controller 150 may be operated in the first output mode, and then operated in the second output mode according to the content change.

The controller 150 may be operated in one of the first to third output modes according to a user operation for selecting an output mode. Specifically, the controller 150 may determine whether or not a video signal is included in content based on the kind of source device coupled to the content output apparatus or a filename extension for the content, and then the controller 150 may be automatically operated in one of the first to third output modes. Further, in response to a user operation for selecting the output mode being input, the controller 150 may be manually operated in the one of the first to third output modes according to the input user operation.

For example, in response to an apparatus coupled through the connector 160 of the content output apparatus 1200 being a CD player, the controller 150 may determine that a video signal is not included in content output from the CD player since the CD player is a music reproduction apparatus, and may be automatically operated in the first output mode. However, there may be a case where the user want to watch a still image through the display 120 of the content output apparatus 1200, and to listen to a music file provided to the CD player coupled to the content output apparatus 1200 through the speaker 130 of the content output apparatus 1200 and at least one external speaker. In this case, a video signal corresponding to the still image output through the display 120 of the content output apparatus 1200 and an audio signal, which is provided from the CD player coupled through the connector 160 of the content output apparatus 1200 and output through the speaker 130 and the at least one external speaker, do not have to be in synchronization with each other. Therefore, even when the controller 150 determines the kind of connected source device and determines the content output apparatus to be automatically operated in the first output mode, the controller 150 may be operated in the second output mode according to a user operation for selecting the second output mode in response to the second output mode, in which the audio signal of the at least one external speaker is synchronization with the audio signal output through the speaker 130, being desired by the user.

Although it is assumed that the video signal is not output from the content output apparatus 100 in the second output mode, that is, the multi-room mode 1 which has been described in FIG. 10, the description for the multi-room mode 1 may also be applied to the circumstances like the above-described example in which the video signal output from the content output apparatus 1200 and the audio signals output from the at least one external speaker and the speaker 130 do not have to be in synchronization with each other in response to the video signal being output from the content output apparatus 1200.

Further, in response to the first output mode being selected through a user operation in the state in which the video signal is not included in the content, the controller 150 may display an information message for the output mode selection in the display 120.

That is, the controller 150 may be automatically operated in the second output mode in the state in which the video signal is not included in the content, and in response to the user operation for selecting the first output mode being input, the controller may display a description for the first output mode suitable for the case where the video signal is included in the content and the information message for the output mode selection, in which the second output mode is more suitable in a current state, in the display 120. The description for the first output mode may include contents in which the current content output apparatus 1200 reproduces video as well as audio, and thus the first output mode with no transmission delay has to be selected so that the video signal output through the display 120, the audio signal output through the speaker 130, and the audio signal output through the at least one external speaker may be in synchronization with each other.

Figure 13:
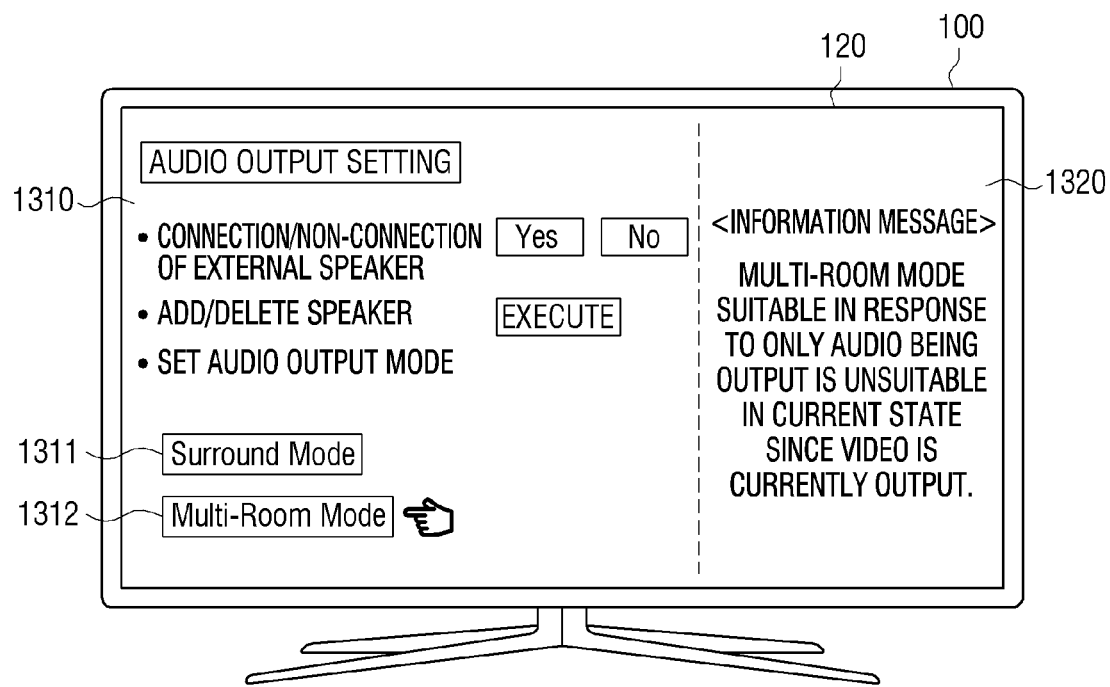
FIG. 13 is a view illustrating an information message for output mode selection according to an exemplary embodiment.

FIG. 13 is a view illustrating an information message for output mode selection according to an exemplary embodiment.

Referring to FIG. 13, a screen including a region 1310 for audio output setting and a region 1320 for an information message for output mode selection may be displayed in the display 120 of the content output apparatus 100. The user may maintain or release connection to an external speaker through the item indicating whether or not the external speaker is coupled illustrated in the region 1310 for audio output setting. The user may additionally register another external speaker or delete a previously registered external speaker through the item for speaker addition/deletion illustrated in the region 1310. The user may set one of a surround mode 1311 and a multi-room mode 1312 through the item for audio output mode setting illustrated in the region 1310. It is assumed that the surround mode 1311 corresponds to the first output mode, and the multi-room mode corresponds to the second output mode.

For example, in response to a user operation for selecting the multi-room mode 1320 being input in a state in which the content output apparatus 100 is outputting content that includes a video signal, the controller 150 may determine that the surround mode, which is the first output mode, is suitable as the output mode since the video signal is included in the content. Thus, the controller 150 may display a message "since video is currently output, the multi-room mode, which is suitable in response to only audio being output, is not suitable in the current state" within the region 1320 for displaying an information message.

The controller 150 may be operated in one of the first output mode and the third output mode according to a user operation in a state in which a video signal is included in content. That is, the controller 150 may be automatically operated in the first output mode in the state in which the video signal is included in the content, but the controller 150 may be operated in the third output mode in response to a user operation which does not select the first output mode being input.

Thus, the controller 150 may transmit the audio signal to the at least one external speaker, and output the video signal and the audio signal through the synchronization of the video signal and the audio signal separately from an audio signal output operation of the at least one speaker. Therefore, the controller 150 may be operated to be suitable for the case where the first user may watch video and listen to audio through a TV in a living room, and the second user may listen to only the audio in a different room located away from the living room.

Figure 14:
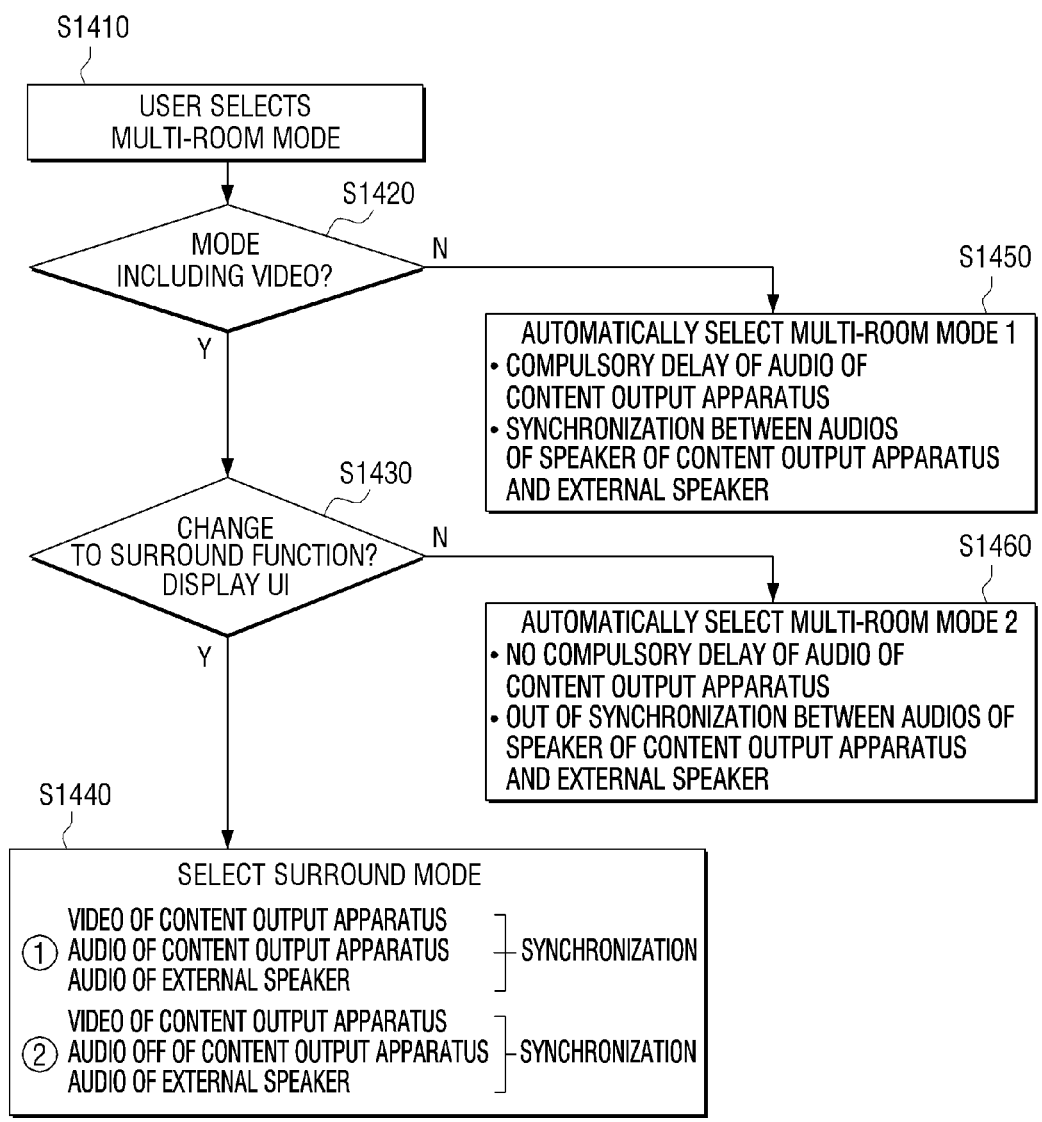
FIGS. 14 to 16 are flow charts illustrating operation processes in one of a plurality of output modes according to a user operation for selecting the output mode according to various exemplary embodiments.
Figure 15:
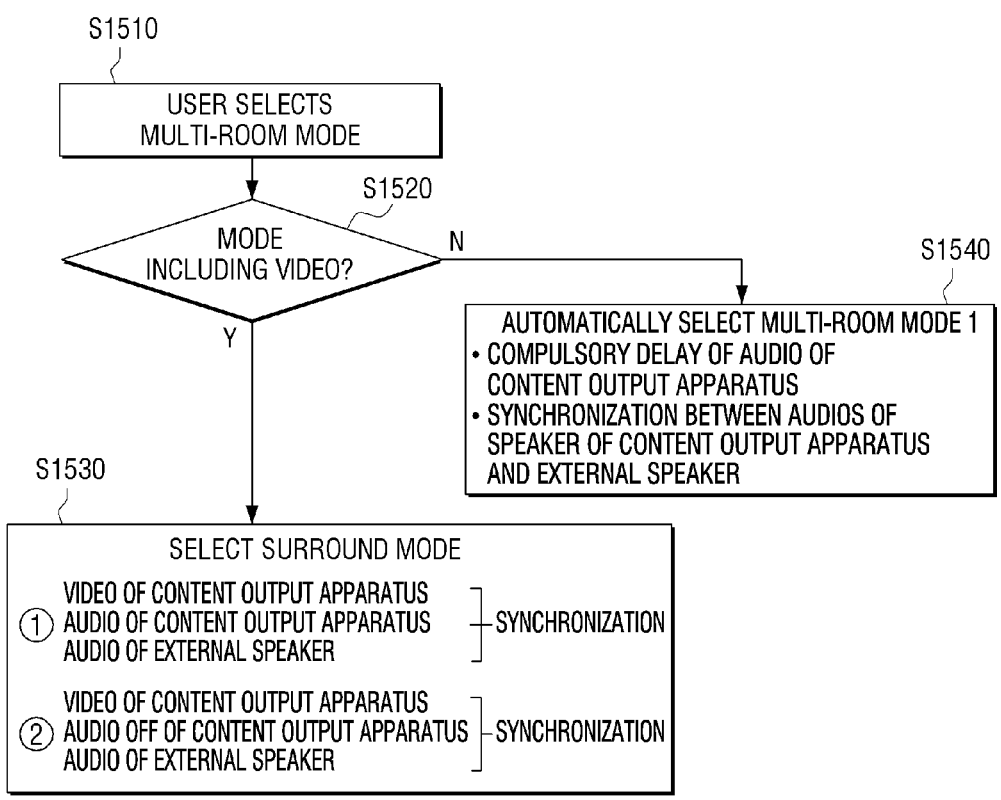
Figure 16:
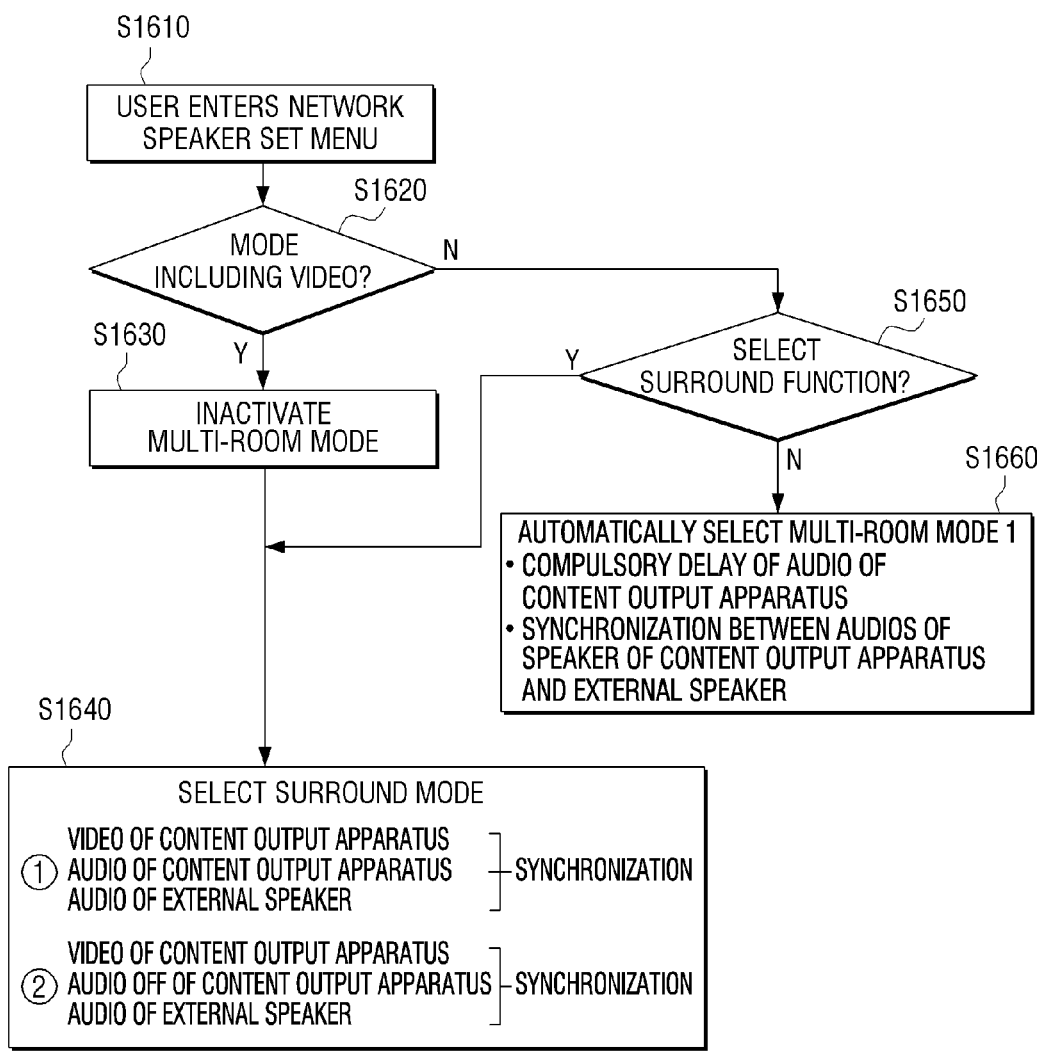

FIGS. 14 to 16 are flow charts illustrating operation processes in one of a plurality of output modes according to a user operation for selecting an output mode according to various exemplary embodiments.

Referring to FIG. 14, in response to a user operation for selecting a multi-room mode being input by the user (S1410), the controller 150 may determine whether or not a video signal is included in content (S1420), and the controller 150 may display a confirmation message for changing to the surround mode (first output mode) (S1430) in response to the video signal being included in the content (S1420-Y). In response to a user operation for selecting "YES" with respect to the confirmation message for changing to a surround mode being input (S1430-Y), the controller 150 may be operated in the surround mode according to the user operation (S1440). The surround mode may be implemented with two exemplary embodiments according to whether or not an audio signal is to be output through the speaker 130 of the content output apparatus 100. Specifically, in one exemplary embodiment, in response to the audio signal that is to be output through the speaker 130, all the video signal output through the display 120 of the content output apparatus 100, the audio signal output through the speaker 130, and an audio signal output through an external speaker are synchronized with each other. In the other exemplary embodiment, in response to there being no audio signal to be output through the speaker 130, the video signal output through the display 120 of the content output apparatus 100 and the audio signal output through the external speaker are in synchronization with each other. In response to the video signal not being included in the content (S1420-N), the controller 150 may be automatically operated in the multi-room mode 1 (second output mode) (S1450). Thus, the controller 150 may compulsorily perform delay processing on the audio signal output through the speaker 130 of the content output apparatus 100, and output the delay-processed audio signal. Therefore, the audio signal output through the external speaker may be in synchronization with the audio signal output through the speaker 130.

In response to a user operation for selecting "NO" with respect to the conformation message for changing to a surround mode being input (S1430-N), the controller 150 may be operated in the multi-room mode 2 according to the user operation (S1460). The controller 150 may not compulsorily perform delay processing on the audio signal output through the speaker 130 of the content output apparatus 100 but may instead directly output the audio signal output through the speaker 130 without delaying the output. Therefore, the audio signal output through the speaker 130 is not in synchronization with the audio signal output through the external speaker.

The process illustrated in FIG. 14 may be applied to the case where the controller 150 is operated in one of the first output mode and the third output mode according to the user operation in response to the video signal being included in the content, and the controller 150 is automatically operated in the second output mode in response to the video signal not being included in the content. Only the example in which the controller 150 automatically determines whether or not the video signal is included in the content has been described in FIG. 14. However, the user may directly input a user operation for determining whether or not the video signal is included in the content, and thus it may be determined whether or not the video signal is included in the content from the user input.

Referring to FIG. 15, in response to a user operation for selecting the multi-room mode being input by the user (S1510), the controller 150 determines whether or not a video signal is included in content (S1520). The controller 150 is automatically operated in the surround mode (first output mode) (S1530) in response to the video signal being included in the content (S1520-Y), and the controller 150 is automatically operated in the multi-room mode 1 (second output mode) (S1540) in response to the video signal not being included in the content (S1520-N).

As described in FIG. 14, in response to the video signal being included in the content, the controller 150 is operated according to the surround mode, and the surround mode may be implemented with two exemplary embodiments according to whether or not the audio signal is to be output through the speaker 130 of the content output apparatus 100. Specifically, in one exemplary embodiment, in response to an audio signal that is to be output through the speaker 130, all the video signal output through the display 120 of the content output apparatus 100, the audio signal output through the speaker 130, and an audio signal output through an external speaker are synchronized with each other. In the other exemplary embodiment, in response to there being no audio signal to be output through the speaker 130, the video signal output through the display 120 of the content output apparatus 100 is synchronized with the audio signal output through the external speaker. Further, in response to the video signal being not included in the content (S1520-N), the controller 150 may be automatically operated in the multi-room mode 1 (second output mode) (S1540), and thus the controller 150 may compulsorily perform delay processing on the audio signal output by the speaker 130 of the content output apparatus 100, and output the delay-processed audio signal. Therefore, the audio signal output by the external speaker may be in synchronization with the audio signal output by the speaker 130.

The process illustrated in FIG. 15 may be applied to the case where the controller 150 is automatically operated in one of the first output mode and the second output mode according to whether or not the video signal is included in the content.

Referring to FIG. 16, in response to a network speaker set menu being entered by the user (S1610), the controller 150 determines whether or not a video signal is include in content (S1620), and inactivates the multi-room mode (S1630) in response to the video signal being included in the content (S1620-Y). That is, the controller 150 may inactivate the multi-room mode (S1630) in response to the video signal being included in the content (S1620-Y), and allow the user not to select the multi-room mode from the beginning. The controller 150 may inactivate the multi-room mode (S1630), and simultaneously the controller 150 may be automatically operated in the surround mode (S1640). The surround mode may be implemented with two exemplary embodiments according to whether or not an audio signal is output through the speaker 130 of the content output apparatus 100. Specifically, in one exemplary embodiment, in response to there being an audio signal to be output through the speaker 130, all the video signal output through the display 120 of the content output apparatus 100, the audio signal output through the speaker 130, and an audio signal output through the external speaker are synchronized with each other. In the other exemplary embodiment, in response to there being no audio signal to be output through the speaker 130, the video signal output through the display 120 of the content output apparatus 100 is synchronized with and the audio signal output through the external speaker.

In response to the video signal being not included in the content (S1620-N), the controller 150 may display a confirmation message for change to a surround mode (first output mode) (S1650). In response to a user operation for selecting "YES" with respect to the confirmation message for changing to a surround mode being input (S1650-Y), the controller 150 may be operated in the surround mode according to the user operation (S1640), and in response to a user operation for selecting "NO" with respect to the confirmation message for changing to a surround mode being input (S1650-N), the controller 150 may be operated in the multi-room mode 1 according to the user operation (S1660). Thus, the controller 150 may perform delay processing on the audio signal output through the speaker 130 of the content output apparatus 100 and output the delay-processed audio signal. Therefore, the audio signal output by the external speaker can be in synchronization with the audio signal output through the speaker 130.

The process illustrated in FIG. 16 may be applied to the case where the controller 150 inactivates the multi-room mode (the second output mode or the third output mode) and is automatically operated in the surround mode (the first output mode) in response to a determination that the video signal is included in the content, and the case where the controller 150 is operated in the surround mode or automatically operated in the multi-room mode 1 (the second output mode) according to a user operation even though it may be determined that no video signal is present in response to the user operation for execution of the surround mode being input.

Since a separate display is not included in a device such as an external speaker, there may be no user interface on the external speaker configured to input a user operation for setting of the external speaker. Thus, a mobile apparatus according to an exemplary embodiment may be provided to display a control screen for the setting of the external speaker, and to receive the user operation for setting of an output mode through connection between a source device and the external speaker. Therefore, the user may set the external speaker using the mobile apparatus, and the convenience of the user may be increased. Description for this will be made in detail with reference to FIG. 17.

Figure 17:
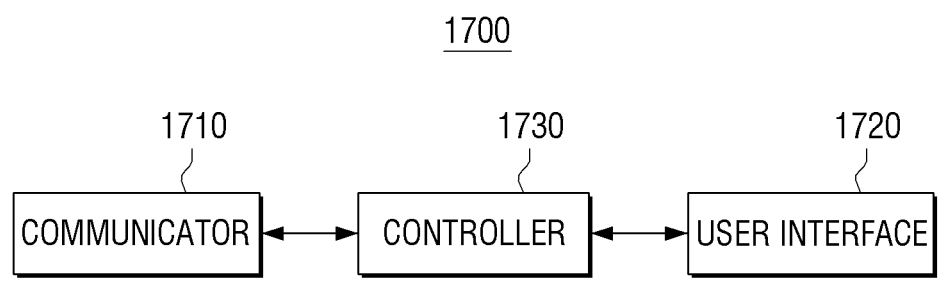
FIG. 17 is a block diagram illustrating a configuration of a mobile apparatus according to an exemplary embodiment.

FIG. 17 is a block diagram illustrating a configuration of a mobile apparatus according to an exemplary embodiment.

Referring to FIG. 17, a mobile apparatus 1700 includes a communicator 1710, a user interface 1720, and a controller 1730.

The communicator 1710 may perform communication with at least one external speaker. For example, the communicator 1710 may couple the mobile apparatus 1700 and the at least one external speaker using various communication methods such as wired/wireless LAN, WAN, Ethernet, Bluetooth, Zigbee, USB, IEEE 1394, and Wi-Fi. Further, the communicator 1710 may perform connection between the mobile apparatus 1700 and various external apparatuses in addition to the connection between the mobile apparatus 1700 and the at least one external speaker. For this, the communicator 1710 may include a chip, module or an input port that corresponds to the communication method. For example, in response to the communication being performed through a wired LAN method, the communicator 1710 may include a wired LAN card (not shown) and an input port (not shown).

The user interface 1720 may display a control screen for the at least one external speaker. For example, the user interface 1720 may be implemented with a touch screen and receive a user touch operation for control of the at least one external speaker. Further, the user interface 1720 may display a control screen configured to receive a user operation for volume control, sound quality control, and sound effect setting of the external speaker and grouping between a plurality of external speakers.

The controller 1730 may control an operation of the external speaker according to a user operation input to the control screen. For example, in response to a user operation for a volume UP/DOWN command of the external speaker being input, the controller 1730 may transmit a control command for volume UP/DOWN to the external speaker according to the input user operation.

In response to a user operation for setting a sound effect of the external speaker to a desired sound effect being input, such as a sound effect for inside a car, the controller 1730 may transmit a control command, which sets the sound effect of the external speaker to the effect (inside a car) according to the input user operation, to the external speaker.

In response to a content output apparatus configured to provide an audio signal to the external speaker being selected in the control screen, the controller 1730 may transmit the control signal, which controls the content output apparatus to communicate with the external speaker according to an output mode corresponding to the kind of content output apparatus among a plurality of output modes, to the content output apparatus. This operation of the controller 1730 will be described in detail with reference to FIG. 18.

Figure 18:
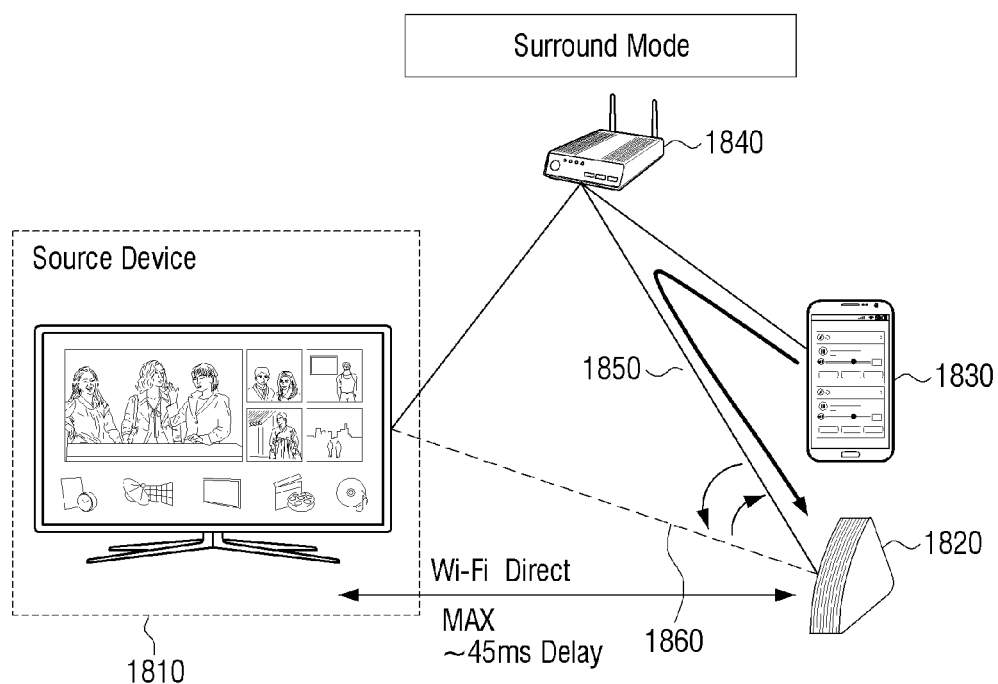
FIG. 18 is a view illustrating a process of setting an output mode to a surround mode through a mobile apparatus according to an exemplary embodiment.

FIG. 18 is a view illustrating an operation for setting an output mode to a surround mode through a mobile apparatus according to an exemplary embodiment.

A TV as a source device 1810, an external speaker 1820 as a target device, a wireless router 1840 serving as an access point (AP), and a mobile apparatus 1830 configured to control the external speaker 1820 are illustrated in FIG. 18.

The TV as the source device 1810, the external speaker 1820 as a target device, and the mobile apparatus 1830 may perform wireless communication through the wireless router 1840. A Wi-Fi method 1850 may be mainly used as the wireless communication method used herein. A wireless communication method such as Bluetooth or Zigbee may be used as the wires communication method used herein. However, the wireless communication method is not limited thereto.

Therefore, to generally transmit an audio signal corresponding to content currently reproduced in the TV as the source device 1810 to the external speaker 1820 as a target device, the audio signal is transmitted through the wireless router 1840.

However, a user interface of the mobile apparatus 1830 configured to perform communication with the external speaker 1820 may display a control screen configured to control the external speaker 1820. In response to a content output apparatus configured to provide the audio signal to the external speaker 1820, that is, the source device 1810 being selected through the control screen, the controller 1730 may transmit the control signal, which controls the content output apparatus to communicate with the external speaker according to the output mode corresponding to the kind of content output apparatus among the plurality of output modes, to the content output apparatus.

That is, the controller 1730 may transmit the control signal to the selected source device 1810, and allow the selected source device 1810 to determine the output mode corresponding to the kind of source device 1810 and to output the audio signal to the external speaker according to the determined output mode.

For example, in FIG. 18, the selected source device 1810 is a TV, and the TV outputs a video signal. Therefore, the controller 1730 may transmit the control signal, which determines an output mode corresponding to the TV as the selected source device and controls the TV to output an audio signal to the external speaker according to the determined output mode, to the TV.

The TV may be operated in the surround mode corresponding to an apparatus configured to output a video signal and may transmit an audio signal corresponding to content currently reproduced to the external speaker 1820 as a target device not through the wireless router 1840 but by using a Wi-Fi Direct method 1860. That is, the TV as the source device 1810 may transmit the audio signal to the external speaker 1820 as the target device without requiring the audio signal to be transmitted through the wireless router 1840.

Thus, transmission delay generated in response to the audio signal being transmitted using the Wi-Fi Direct method 1860 is reduced as compared with transmission delay generated in response to the audio signal being transmitted through the wireless router 1840 using the Wi-Fi method 1850. The transmission delay generated in response to the audio signal being transmitted using the Wi-Fi Direct method 1860 may be up to about 45 ms. The transmission delay of up to about 45 ms not significant enough to affect the synchronization with the video signal and the audio signal corresponding to the content output from the TV as the source device 1810. Therefore, the audio signal and the video signal corresponding to the content output from the TV as the source device 1810 are synchronized with the audio signal output from the external speaker 1820 as a target device.

FIG. 18 has been described as an exemplary embodiment in which the external speaker is controlled through the mobile apparatus and the control command is transmitted to the source device in the surround mode. However, in another exemplary embodiment the external speaker may be controlled through the mobile apparatus and the control command transmitted to the source device in the multi-room mode as well.

The plurality of output modes to be selected by the selected content output apparatus may include at least one of a first output mode that provides the audio signal to the at least one external speaker, and outputs the video signal and the audio signal in synchronization with an audio signal output operation of the at least one external speaker, a second output mode that provides the audio signal to the at least one external speaker, and outputs the audio signal in synchronization with the audio signal output operation of the at least one external speaker, and a third output mode that provides the audio signal to the at least one external speaker, and outputs the video signal and the audio signal output by the content output apparatus in synchronization and the output of the audio signal of the at least one external speaker is performed separately. The first output mode corresponds to the surround mode, the second output mode corresponds to the multi-room mode 1, and the third output mode corresponds to the multi-room mode 2. The output modes have been previously described, and thus the detailed description thereof will not be repeated.

In response to the content output apparatus being an apparatus configured to provide content including a video signal and an audio signal, the controller 1730 may output the control signal for controlling the content output apparatus to be operated in one of the first output mode, which outputs the video signal and the audio signal through the synchronization with the audio signal output operation of the at least one external speaker, and the third output mode, which outputs the video signal and the audio signal in the synchronization with the video signal output by the content output apparatus and the audio signal output operation of the at least one external speaker is performed separately, to the content output apparatus. In response to the content output apparatus being an apparatus configured to provide content including only an audio signal, the controller 1730 may output the control signal for controlling the content output apparatus to be operated in the second output mode, which outputs the audio signal through the synchronization with the audio signal output operation of the at least one external speaker, to the content output apparatus.

For example, in response to a content output apparatus selected in the control screen being a TV, since the TV is an apparatus configured to provide content including a video signal and an audio signal, the controller 1730 may transmit the control signal, which allows the content output apparatus to be operated in the first output mode that outputs the video signal and the audio signal through the synchronization with the audio signal output operation of the at least one external speaker, to the content output apparatus.

Further, in response to the content output apparatus selected in the control screen being a CD player, and the CD player being an apparatus configured to provide content including only an audio signal, the controller 1730 may transmit the control signal, which allows the content output apparatus to be operated in the second output mode, which outputs the audio signal through the synchronization with the audio signal output operation of the at least one external speaker, to the content output apparatus.

In response to a content output apparatus configured to provide an audio signal to the at least one external speaker being selected in the control screen, the controller 1730 may transmit the control signal, which allows the content output apparatus to communicate with the external speaker according to one of the plurality of output modes determined based on a reproduction mode of content provided from the selected content output apparatus, to the content output apparatus.

For example, in response to content provided from a TV being video in the state in which the TV is selected as the content output apparatus configured to provide the audio signal to the at least one external speaker in the control screen, the video signal and the audio signal are output in the reproduction mode of the content since the content includes the video signal. Therefore, the controller 1730 may transmit the control signal, which allows the TV to be operated in one of the first output mode and the third output mode, to the TV.

In response to the content provided from the TV being music, only an audio signal is output in the reproduction mode of the content since the content includes only the audio signal. Therefore, the controller 1730 may transmit the control signal, which allows the TV to be operated in the second output mode, to the TV.

The process which has been previously described, in which the controller 150 of the content output apparatus 1200 is operated in one of the plurality of output modes based on the kind of apparatus coupled through the connector 160 or based on whether or not the video signal is included in the content, may be equally applied to the case where the mobile apparatus 1700 transmits the control signal to the content output apparatus 1200.

Figure 19:
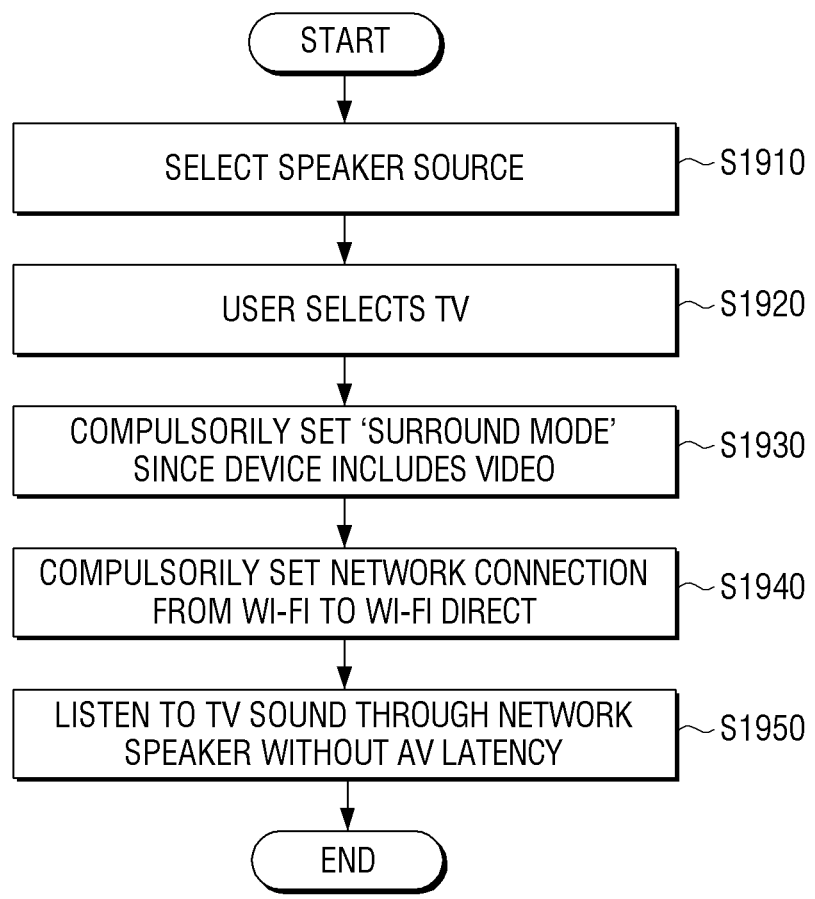
FIG. 19 is a view illustrating a process of determining an output mode in response to an apparatus which can output a video signal being selected as a source device according to an exemplary embodiment.

FIG. 19 is a view illustrating a process for determining an output mode in response to an apparatus which can output a video signal being selected as a source device according to an exemplary embodiment.

Referring to FIG. 19, a user operation for selecting a source of an external speaker in a control screen of a mobile apparatus is input (S1910). In response to a user operation for selecting a TV among various sources being input (S1920), a controller of the TV which is a content output apparatus sets the output mode to the surround mode since the TV is an apparatus configured to reproduce a video signal (S1930). The controller may configure a network connection between the external speaker and the TV as a Wi-Fi method using a wireless router or a Wi-Fi Direct method, which is a direct communication method that does not use the wireless router (S1940). The video signal may be in synchronization with an audio signal without latency between the video signal and the audio signal. Therefore, the audio signal output from the TV is transmitted to the external speaker and then output (S1950).

That is, the process illustrated in FIG. 19 may be applied to the case where the controller 1730 of the mobile apparatus 1700 is operated in the first output mode that outputs a video signal and an audio signal through the synchronization with the audio signal output operation of the at least one external speaker in response to the selected content output apparatus being an apparatus configured to provide content including the audio signal and the video signal.

Figure 20:
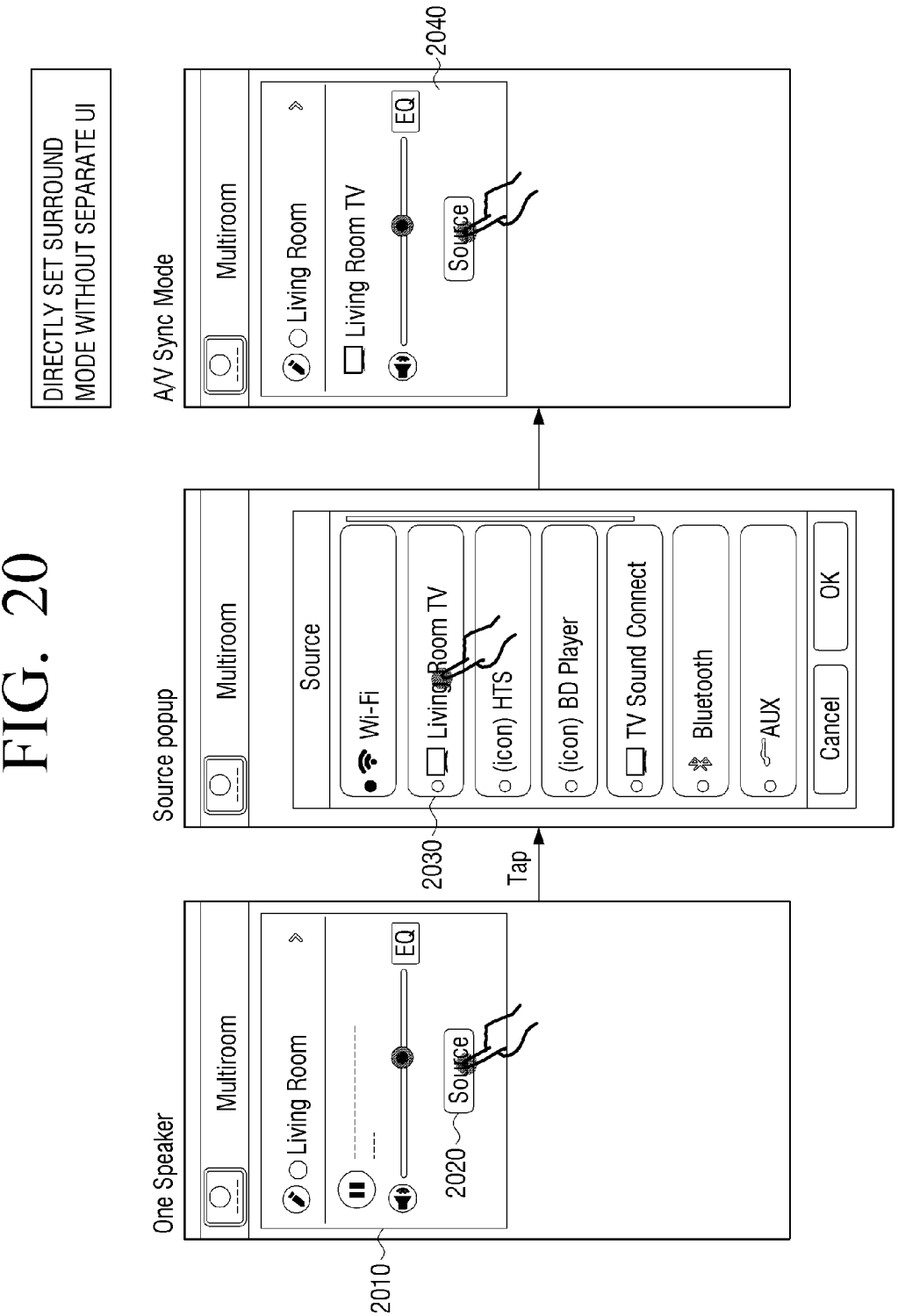
FIG. 20 is a view illustrating a process of determining a surround mode in a user interface of a mobile apparatus according to an exemplary embodiment.

FIG. 20 is a view illustrating a process for determining a surround mode in a user interface of a mobile apparatus according to an exemplary embodiment.

A control screen 2010 for an external speaker, which is displayed by the user interface 1720 of the mobile apparatus 1700, is illustrated in FIG. 20.

In response to a source item 2020 being selected in the control screen 2010 for a speaker existing in a living room, a list for various source devices is displayed. In response to a user operation for selecting a TV item 2030 existing in the living room among the various source devices being input, since the TV is an apparatus configured to provide content including a video signal and an audio signal, the controller 1730 of the mobile apparatus 1700 may transmit the control signal, which allows the TV to be operated in the first output mode which outputs the video signal and the audio signal through synchronization with an audio signal output operation of the speaker existing the living room, to the TV existing in the living room.

The TV receives the control signal transmitted from the mobile apparatus 1700 and is operated in the first output mode. A control screen 2040 for a speaker, which indicates that communication with the TV existing in the living room is connected and the audio signal is provided from the TV, is displayed in the user interface 1720 of the mobile apparatus 1700.

In response to a user operation for grouping at least one of the at least one external speaker in the control screen being input, the controller 1730 may transmit the control signal, which allows a content output apparatus to communicate with the external speakers that are grouped according to an output mode corresponding to the kind of content output apparatus, to the content output apparatus.

For example, in response to a user operation for grouping an external speaker existing in a bedroom and an external speaker existing in a living room being input in the state in which a CD layer which is a current content output apparatus transmits an audio signal to the external speaker existing in the living room and output the audio signal, the controller 1730 may transmit the control signal, which allows the CD player to communicate with the external speakers existing in the bedroom and the living room, which are grouped according to the second output mode corresponding to the CD player, to the CD player.

Figure 21:
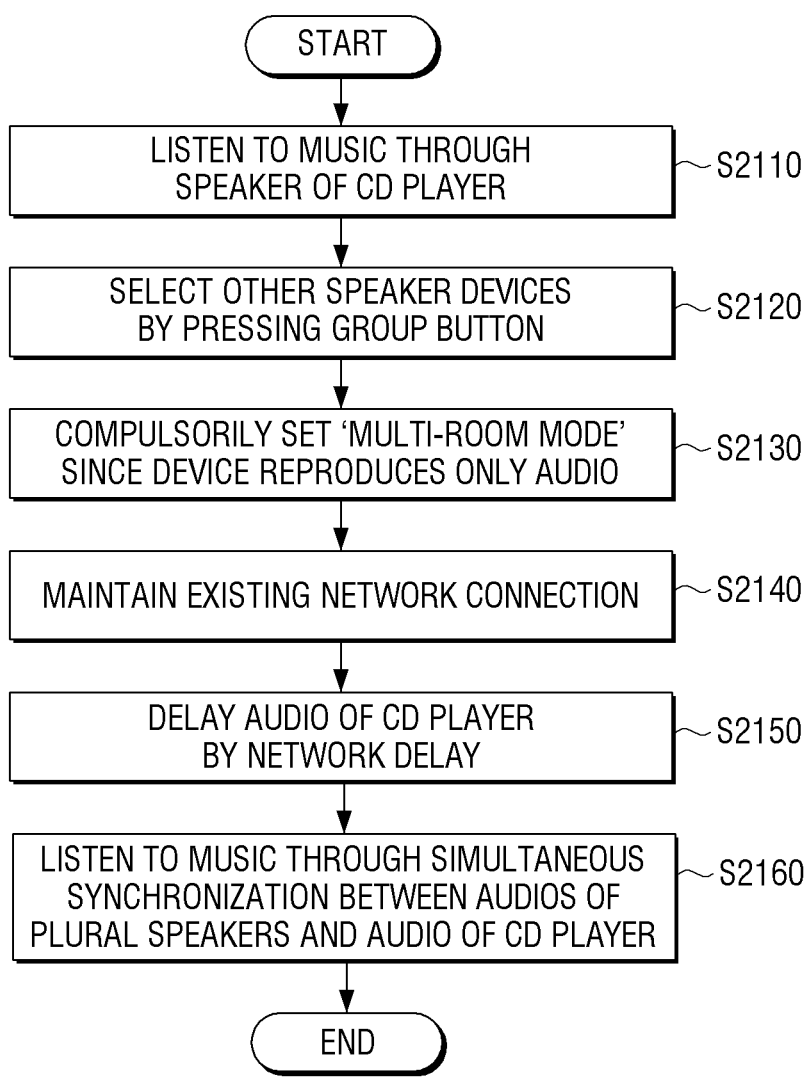
FIG. 21 is a view illustrating a process of determining an output mode in response to an external speaker being added in a state in which an apparatus that can output only an audio signal is a source device according to an exemplary embodiment.

FIG. 21 is a view illustrating a process for determining an output mode in response to an external speaker being added in the state in which an apparatus configured to output only an audio signal is a source device according to an exemplary embodiment.

Referring to FIG. 21, in the state in which an audio signal is output through a speaker of a CD player (S2110), a user operation for adding the external speaker in a control screen of the mobile apparatus 1700 is input (S2120). An item for adding the external speaker may be implemented with an icon called "group", but this is not limited thereto. The item for adding may be implemented with various names.

Since the current source device is the CD player, and the CD player is an apparatus configured to output only the audio signal, a controller of the CD player sets the output mode to the multi-room mode (S2130). Unlike the setting of the surround mode in FIG. 19, the communication method between the external speaker and the CD player is maintained as a Wi-Fi method. That is, the existing communication method is maintained (S2140).

The controller of the CD player performs delay processing on the audio signal of the CD player by transmission delay and outputs the delayed audio signal (S2150), and the audio signal output from the CD player may be in synchronization with the audio signal output from the external speaker. Therefore, the audio signals output from the CD player and the audio signal output from the external speaker are in synchronization with each other and output simultaneously (S2160).

Figure 22:
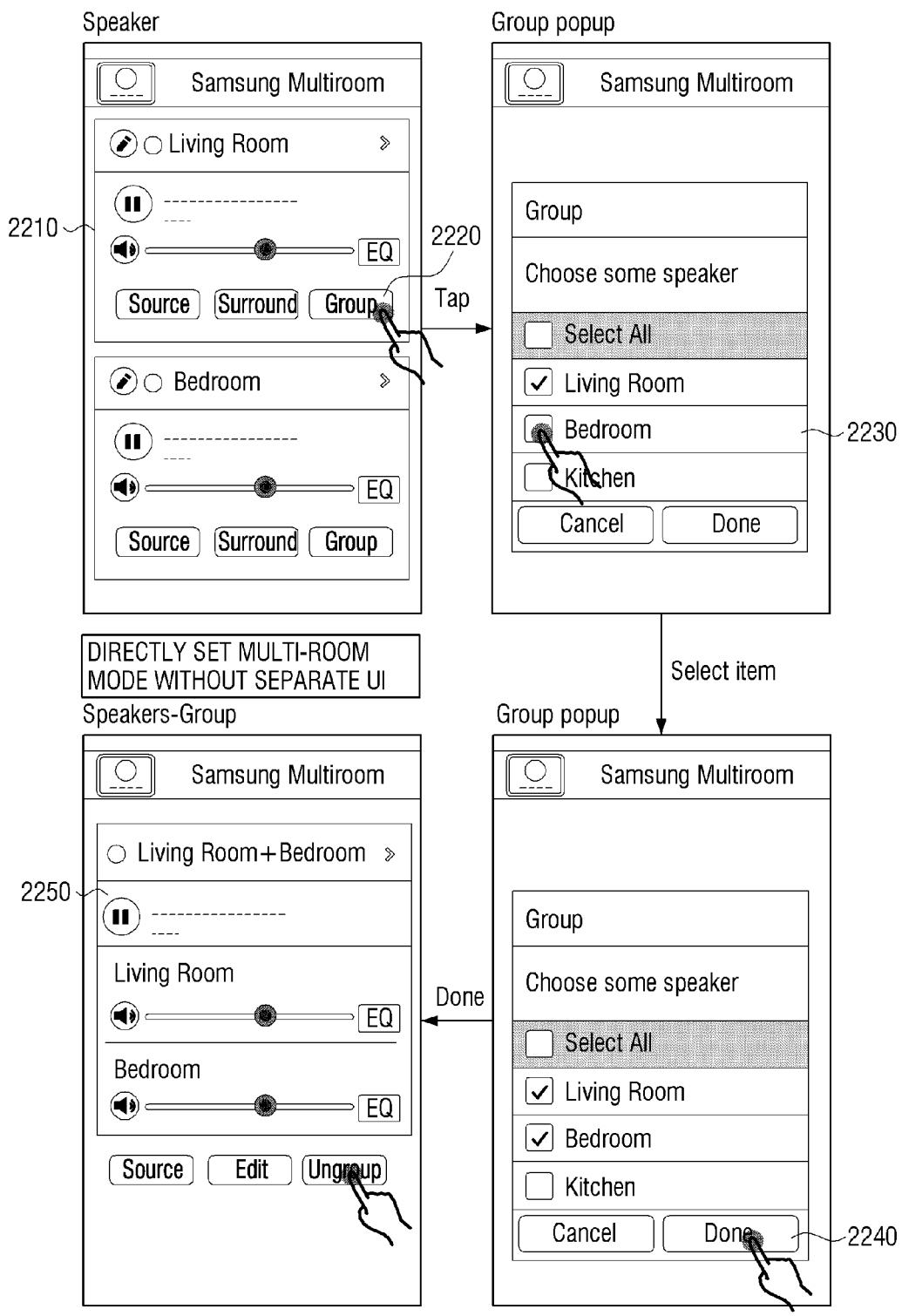
FIG. 22 is a view illustrating a process of determining a multi-room mode in a user interface of a mobile apparatus according to an exemplary embodiment.

FIG. 22 is a view illustrating a process for determining a multi-room mode in a user interface of a mobile apparatus according to an exemplary embodiment.

Control screens for two external speakers displayed by the user interface 1720 of the mobile apparatus 1700 are illustrated in FIG. 22. Specifically, the control screens for two external speakers include a control screen 2210 for a speaker existing in a living room and a control screen for a speaker existing in a bedroom. It is assumed that the audio signal output from the current CD player is output only through the speaker existing in the bedroom.

In response to a group item 2220 for adding another external speaker being selected in the control screen 2210 for the speaker existing in the living room, a list for speakers according to groups is displayed. FIG. 22 has exemplified that speakers are grouped according to a place in which the speakers are located, but the grouping of the speakers is not limited thereto. The grouping of the speakers may be performed according to Alphabetical order, output performance, or other criteria for grouping.

In response to a user operation for selecting an item 2230 for selecting the speaker located in the bedroom in the list for the speakers according to the group being input, and a user operation 2240 for executing the item 2230 being input, since the CD player is an apparatus configured to provide content including only an audio signal, the controller 1730 of the mobile apparatus 1700 may transmit the control signal, which controls the CD player to be operated in the second mode that outputs the audio signal through the newly added speaker located in the bedroom in synchronization with an audio signal output operation of the speaker located in the living room, to the CD player.

Thus, the CD player receives the control signal transmitted from the mobile apparatus 1700 and is operated in the second output mode, and a control screen 2250 for the speaker located in the living room and the speaker located in the bed room, which indicates that all the speakers located in the living room and the bed room communicate with the CD player, and the audio signal is provided from the CD player to the speakers, is displayed in the user interface 1720 of the mobile apparatus 1700.

Figure 23:
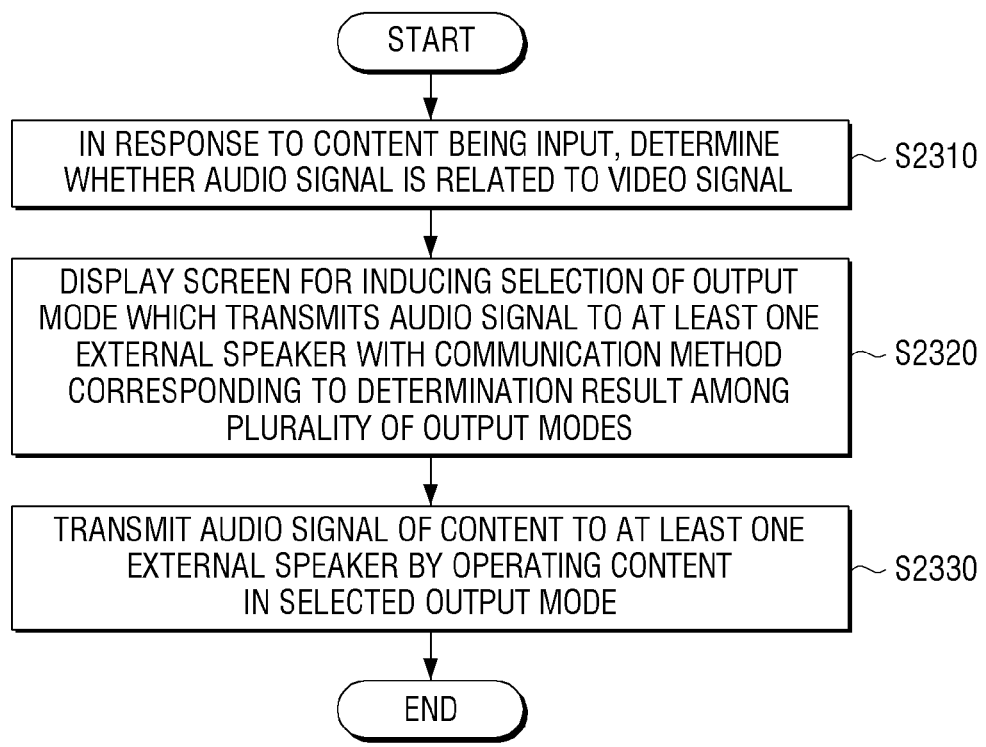
FIG. 23 is a flow chart illustrating a method of controlling a content output apparatus according to an exemplary embodiment.

FIG. 23 is a flow chart illustrating a method of controlling a content output apparatus according to an exemplary embodiment.

The method illustrated in FIG. 23 is a controlling method of a content output apparatus including a receiver configured to receive content, a display configured to output a video signal of the content, a speaker configured to output an audio signal of the content, and a communicator configured to transmit the audio signal to at least one external speaker. According to the controlling method of a content output apparatus illustrated in FIG. 23, in response to the content being input, it is determined that the audio signal is related to the video signal (S2310).

A screen for inducing a selection of an output mode which transmits the audio signal to at least one external speaker with a communication method corresponding to the determination result among a plurality of output modes is displayed (S2320).

The audio signal of the content is transmitted to the at least one external speaker by operating the content in the selected output mode (S2330).

The transmitting may include controlling the display and the speaker to output the video signal and the audio signal in synchronization with an audio signal output operation of the at least one external speaker in the first output mode among the plurality of output modes, and controlling the speaker to output the audio signal in synchronization with the audio signal output operation of the at least one external speaker in the second output mode among the plurality of output modes.

The transmitting may include transmitting the audio signal to the at least one external speaker, and controlling the display and the speaker to output the video signal and the audio signal in synchronization with the audio signal and separately perform the audio signal output operation of the at least one external speaker in the third output mode among the plurality of output modes.

The transmitting may further include controlling the communicator to perform communication with the at least one external speaker in the first output mode through a second communication method different from a first communication method in the second output mode and the third output mode.

The controlling of the communicator may include controlling the communicator to perform communication with the at least one external speaker through a Wi-Fi Direct method in the first output mode, and to perform communication with the at least one external speaker through a Wi-Fi method in the second output mode and the third output mode.

The transmitting may include allowing the content output apparatus to be operated in the first output mode in response to the video signal being included in the content, and allowing the content output apparatus to be operated in the second output mode in response to the video signal not being included in the content.

The method of controlling a content output apparatus according to an exemplary embodiment may further include determining whether or not the video signal is included in the content based on the kind of source device configured to provide the content and coupled to the content output apparatus.

The transmitting may include allowing the content output apparatus to be operated in one of the first output mode, the second output mode, and the third output mode according to a user operation for selecting the output mode.

The transmitting may further include displaying an information message for an output mode selection in the display in response to the first output mode being selected by a user operation in the state in which the video signal is not included in the content.

The transmitting may include allowing the content output apparatus to be operated in one of the first output mode and the third output mode according to the user operation in the state in which the video signal is included in the content.

Figure 24:
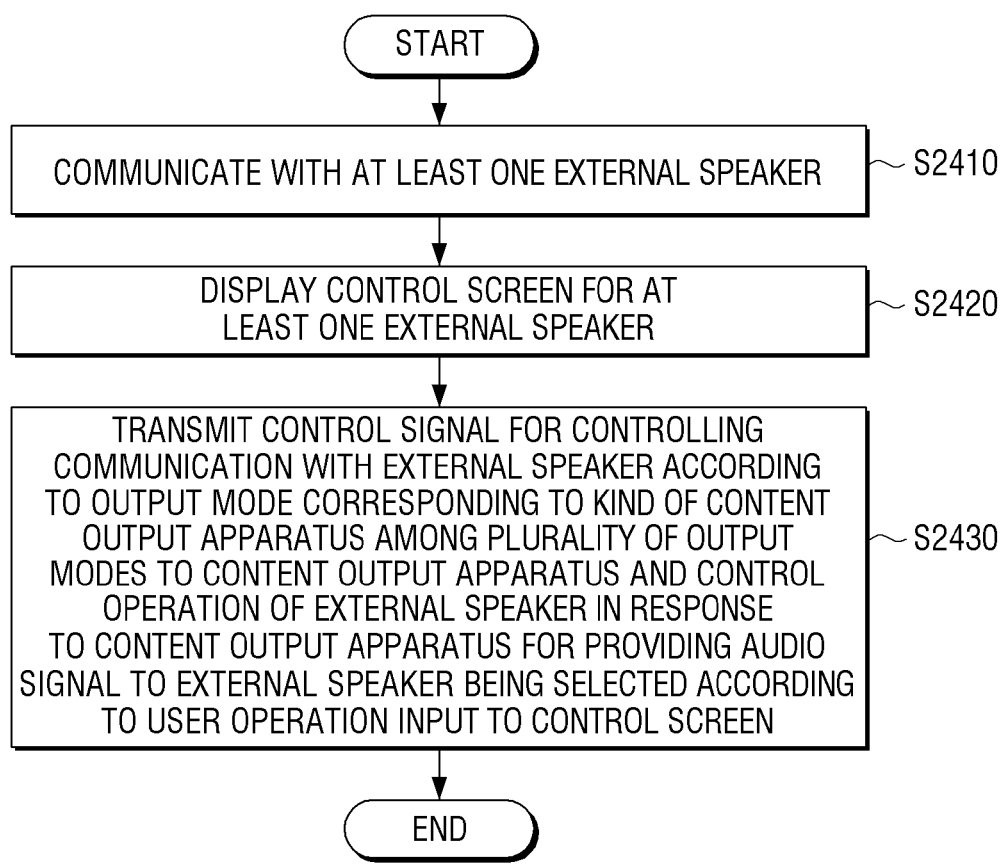
FIG. 24 is a flow chart illustrating a method of controlling a mobile apparatus according to an exemplary embodiment.

FIG. 24 is a flow chart illustrating a method of controlling a mobile apparatus according to an exemplary embodiment.

According to the method illustrated in FIG. 24, communication with at least one external speaker is performed (S2410).

Then, a control screen for the at least one external speaker is displayed (S2420).

An operation of the external speaker is controlled according to a user operation input in the control screen (S2430).

The controlling may include transmitting the control signal, which controls a content output apparatus to communicate with the external speaker according to an output mode corresponding to the kind of content output apparatus among a plurality of output modes, to the content output apparatus in response to the content output apparatus configured to provide an audio signal to the external speaker being selected in the control screen.

The plurality of output modes may include at least one of a first output mode that provides the audio signal to the at least one external speaker, and outputs the video signal and the audio signal in synchronization with an audio signal output operation of the at least one external speaker, a second output mode that provides the audio signal to the at least one external speaker, and outputs the audio signal in synchronization with the audio signal output operation of the at least one external speaker, and a third output mode that provides the audio signal to the at least one external speaker, and outputs the video signal and the audio signal in synchronization and separately performs the audio signal output operation of the at least one external speaker.

The controlling may include transmitting the control signal for controlling the content output apparatus to be operated in one of the first output mode, which outputs the video signal and the audio signal in synchronization with the audio signal output operation of the at least one external speaker, and the third output mode, which outputs the video signal and the audio signal in synchronization and separately performs the audio signal output operation of the at least one external speaker, to the content output apparatus in response to the content output apparatus being an apparatus configured to provide content including the video signal and the audio signal. The controlling may further include transmitting the control signal for controlling the content output apparatus to be operated in the second output mode, which outputs the audio signal in synchronization with the audio signal output operation of the at least one external speaker, to the content output apparatus in response to the content output apparatus being an apparatus configured to provide content including only the audio signal.

The controlling may include transmitting the control signal, which controls the content output apparatus to communicate with the external speaker according to one of the plurality of output modes determined based on a reproduction mode of content provided from a selected content output apparatus, to the content output apparatus in response to the content output apparatus configured to provide the audio signal to the external speaker being selected in the control screen.

The controlling may include transmitting the control signal, which controls the content output apparatus to communicate with external speakers grouped according to an output mode corresponding to the kind of content output apparatus, to the content output apparatus in response to a user operation for grouping at least one of the at least one external speaker in the control screen being input.

A non-transitory computer-readable medium, in which programs for sequentially executing the controlling methods according to the exemplary embodiments are stored, may be provided.

As an example, a non-transitory computer-readable medium, in which a program for executing an operation of determining whether the audio signal is related to the video signal in response to the content being input, displaying a screen for inducing an output mode which transmits the audio signal to the at least one external speaker with a communication method corresponding to the determination result among a plurality of output modes, and transmitting the audio signal of the content to the at least one external speaker by operating the content in the selected output mode, may be provided.

As another example, a non-transitory computer-recordable medium, in which a program for executing an operation of controlling an operation of an external speaker according to a user operation input to a control screen is stored, may be provided.

The non-transitory computer-recordable medium is not a medium configured to temporarily store data such as a register, a cache, or a memory but an apparatus-readable medium configured to semi-permanently store data. Specifically, the above-described various applications or programs may be stored in the non-transitory apparatus-readable medium such as a CD, a DVD, a hard disc, a BD, a USB storage device, a memory card, or a read only memory (ROM), and provided.

Although buses are not illustrated in the block diagrams illustrating the content output apparatus and the mobile apparatus, communication between configurations in the content output apparatus and the mobile apparatus may be performed using bus connections. A processor such as a central processing unit (CPU), or a microprocessor configured to perform the above-described various operations may be further included in the apparatuses.

The foregoing exemplary embodiments and advantages are merely exemplary and are not to be construed as limiting the present inventive concept. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A content output apparatus comprising:
a display;
a speaker;
a communicator; and
a processor configured to control the display to output a video signal of content, control the speaker to output an audio signal of the content, determine whether the audio signal is related to the video signal, and control the display to display a user interface for inducing a selection of an output mode which transmits the audio signal through the communicator to at least one external speaker with a communication method corresponding to the determination result among a plurality of output modes.

2. The content output apparatus as claimed in claim 1, wherein the processor is configured to control the display and the speaker to synchronize the output of the video signal and the output of the audio signal with an audio signal output operation of the at least one external speaker in a first output mode among the plurality of output modes, and control the speaker to synchronize the output of the audio signal with the audio signal output operation of the at least one external speaker in a second output mode among the plurality of output modes.

3. The content output apparatus as claimed in claim 1, wherein the processor is configured to, in response to the audio signal being determined to be related to the video signal, even though a user manipulation for selecting a second output mode is input, display the user interface for inducing to select a first output mode or operate in the first output mode automatically.

4. The content output apparatus as claimed in claim 2, wherein the processor is configured to in response to the audio signal being determined to be related to the video signal, activate a user interface element for selecting the first output mode and deactivate a user interface element for selecting the second output mode in the user interface.

5. The content output apparatus as claimed in claim 2, wherein the processor is configured to, in a third output mode among the plurality of output modes, control the communicator to transmit the audio signal to the at least one external speaker, and control the display and the speaker to synchronize the output of the video signal and the audio signal separately from the audio signal output operation of the at least one external speaker.

6. The content output apparatus as claimed in claim 5, wherein the processor is configured to, in the first output mode, control the communicator to perform communication with the at least one external speaker through a second communication method that is different from a first communication method used in the second output mode and the third output mode.

7. The content output apparatus as claimed in claim 6, wherein the processor is configured to control the communicator to perform communication with the at least one external speaker through a Wi-Fi Direct method in the first output mode, and to perform communication with the at least one external speaker through a Wi-Fi method in the second output mode and the third output mode.

8. The content output apparatus as claimed in claim 2, wherein the processor is configured to be operated in the first output mode in response to determining that the video signal is included in the content, and to be operated in the second output mode in response to determining that the video signal is not included in the content.

9. The content output apparatus as claimed in claim 8, further comprising a connector configured to be connectable to a source device configured to provide the content,
wherein the processor is configured to determine whether the video signal is included in the content based on a type of the source device coupled to the connector.

10. The content output apparatus as claimed in claim 5, wherein the processor is configured to be operated in one of the first to third output modes according to a user operation for selecting the output mode.

11. The content output apparatus as claimed in claim 10, wherein the processor is configured to control the display to display an information message for an output mode selection in response to the first output mode being selected by the user operation in a state in which the video signal is not included in the content.

12. The content output apparatus as claimed in claim 10, wherein the processor is configured to be operated in one of the first output mode and the third output mode according to the user operation in a state in which the video signal is included in the content.

13. A mobile apparatus comprising:
a communicator;
a display; and
a processor configured to control the display to display a user interface for controlling at least one external speaker, control the communicator to transmit a control signal, which controls a content output apparatus configured to provide an audio signal to the at least one external speaker to communicate with the at least one external speaker according to an output mode corresponding to a type of the content output apparatus among a plurality of output modes, to the content output apparatus in response to the content output apparatus being selected in the user interface.

14. The mobile apparatus as claimed in claim 13, wherein the processor is configured to control the communicator to transmit the control signal to control the content output apparatus to communicate with the at least one external speaker according to the plurality of output modes, wherein the plurality of output modes include at least one of a first output mode which provides the audio signal to the at least one external speaker and outputs a video signal and the audio signal in synchronization with an audio signal output operation of the at least one external speaker, a second output mode which provides the audio signal to the at least one external speaker and outputs the audio signal in synchronization with the audio signal output operation of the at least one external speaker, and a third output mode which provides the audio signal to the at least one external speaker and outputs, separately from the audio signal output operation to the at least one external speaker, the video signal and the audio signal in synchronization with the video signal and the audio signal.

15. The mobile apparatus as claimed in claim 14, wherein the processor is configured to control the communicator to transmit the control signal for controlling the content output apparatus to be operated in one of the first output mode and the third output mode to the content output apparatus in response to the content output apparatus being an apparatus configured to provide content including the video signal and the audio signal, and
the processor is configured to transmit the control signal for controlling the content output apparatus to be operated in the second output mode to the content output apparatus in response to the content output apparatus being an apparatus configured to provide content including only the audio signal.

16. The mobile apparatus as claimed in claim 13, wherein the processor is configured to control the communicator to transmit the control signal, which controls the content output apparatus to communicate with the at least one external speaker according to one of the plurality of output modes determined based on a reproduction mode of the content provided from the content output apparatus, to the content output apparatus in response to the content output apparatus configured to provide the audio signal to the at least one external speaker being selected in the user interface.

17. The mobile apparatus as claimed in claim 13, wherein the processor is configured to transmit the control signal, which controls the content output apparatus to communicate with a grouped external speaker according to the output mode corresponding to the type of the content output apparatus, to the content output apparatus in response to a user operation for grouping at least one of the at least one external speaker being input in the user interface.

18. A method of controlling a content output apparatus, the method comprising:
outputting a video signal of content via a display of the content output apparatus and outputting an audio signal of the content via a speaker of the content output apparatus;
determining whether the audio signal is related to the video signal; and
displaying a user interface for inducing a selection of an output mode which transmits the audio signal to at least one external speaker with a communication method corresponding to the determination result among a plurality of output modes.

19. The method as claimed in claim 18, further comprising: controlling the display and the speaker to output the video signal and the audio signal in synchronization with an audio signal output operation of the at least one external speaker in a first output mode among the plurality of output modes, and controlling the speaker to output the audio signal in synchronization with the audio signal output operation of the at least one external speaker in a second output mode among the plurality of output modes.

20. A method of controlling a mobile apparatus, the method comprising:
displaying a user interface for controlling at least one external speaker; and
transmitting a control signal, which controls a content output apparatus configured to provide an audio signal to the at least one external to communicate with the at least one external speaker according to an output mode among a plurality of output modes corresponding to a type of the content output apparatus, to the content output apparatus in response to the content output apparatus being selected in the user interface.

* * * * *